(12) United States Patent
Shizuno

(10) Patent No.: US 10,916,943 B2
(45) Date of Patent: Feb. 9, 2021

(54) DISTRIBUTED ELECTRICITY STORAGE SYSTEM, POWER CONTROL METHOD, AND PROGRAM

(71) Applicant: NEC CORPORATION, Tokyo (JP)

(72) Inventor: Takayuki Shizuno, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/561,887

(22) PCT Filed: Mar. 22, 2016

(86) PCT No.: PCT/JP2016/058915
§ 371 (c)(1),
(2) Date: Sep. 26, 2017

(87) PCT Pub. No.: WO2016/158551
PCT Pub. Date: Oct. 6, 2016

(65) Prior Publication Data
US 2018/0123347 A1    May 3, 2018

(30) Foreign Application Priority Data

Mar. 27, 2015  (JP) ................... 2015-067118

(51) Int. Cl.
  *H02J 3/28*       (2006.01)
  *H02J 3/38*       (2006.01)
  (Continued)

(52) U.S. Cl.
  CPC ............. *H02J 3/28* (2013.01); *G05B 15/02* (2013.01); *H02J 3/32* (2013.01); *H02J 3/38* (2013.01);
  (Continued)

(58) Field of Classification Search
  None
  See application file for complete search history.

(56) References Cited

U.S. PATENT DOCUMENTS 7,719,231 B2 *  5/2010  Pellenc ............... H01M 10/425
                                            320/132
8,901,876 B2 * 12/2014  Nishibayashi ...... H01M 10/482
                                            320/101
(Continued)

FOREIGN PATENT DOCUMENTS

JP    2008-099527 A      4/2008
JP    2008099527 A   *   4/2008
(Continued)

OTHER PUBLICATIONS

Harting, Curt, "AC Transmission Line Losses", Stanford, Oct. 2010, pp. 1-2 (Year: 2010).*

(Continued)

*Primary Examiner* — Mohammad Ali
*Assistant Examiner* — David Earl Ogg
(74) *Attorney, Agent, or Firm* — Finnegan, Henderson, Farabow, Garrett & Dunner, L.L.P.

(57) ABSTRACT

A distributed electricity storage system (1) includes a plurality of electricity storage apparatuses (110) which are connected to the same distribution line (50), a determination unit (310) that determines excess or deficit in the distribution line (50), an acquisition unit (320) that acquires, with respect to each of the plurality of electricity storage apparatuses, state information indicating a state of an electricity storage apparatus and direction information indicating an operating direction of a charging direction or a discharging direction, and a selection unit (330) that selects an electricity storage apparatus to be controlled in charging and discharging operations from the plurality of electricity storage apparatuses, using a determination result of the excess or deficient power, the state information, and the direction information.

8 Claims, 13 Drawing Sheets

(51) Int. Cl.
*H02J 7/00* (2006.01)
*H02J 3/32* (2006.01)
*G05B 15/02* (2006.01)
*H02J 3/46* (2006.01)

(52) U.S. Cl.
CPC ............... *H02J 3/381* (2013.01); *H02J 3/46* (2013.01); *H02J 7/00* (2013.01)

(56) References Cited

U.S. PATENT DOCUMENTS

2004/0164706 A1* 8/2004 Osborne ............... H02J 7/0018
 320/116
2009/0267565 A1* 10/2009 Studyvin ............... H02J 7/0016
 320/116

FOREIGN PATENT DOCUMENTS

| JP | 2012-205436 A | 10/2012 |
| JP | 2014-079076 A | 4/2014 |
| WO | WO2011/016273 A1 | 2/2011 |

OTHER PUBLICATIONS

International Search Report dated Jun. 7, 2016, in corresponding PCT International Application.

\* cited by examiner

FIG. 5

| ELECTRICITY STORAGE SYSTEM ID | STATE INFORMATION | | | DIRECTION INFORMATION | PRESENCE OR ABSENCE OF DISTRIBUTED POWER SUPPLY | MEASURED POWER (LOAD→DOWNSTREAM LOAD −GENERATED POWER) [kW] |
|---|---|---|---|---|---|---|
| | RATED CAPACITY [kWh] | CHARGING AND DISCHARGING PERFORMANCE [kW] | SOC [%] | | | |
| 001 (FIRST) | 15 | 3 | 70 | DISCHARGING | PRESENT | −2 (=5+(3−3)−7) |
| 002 (SECOND) | 10 | 2 | 30 | CHARGING | ABSENT | 3 (=3+0(NONE)−0(NONE)) |
| 003 (THIRD) | 7 | 1.5 | 90 | CHARGING | PRESENT | −3 (=2+0(NONE)−5) |

FIG. 6

| ELECTRICITY STORAGE SYSTEM ID | STATE INFORMATION | | | DIRECTION INFORMATION | PRESENCE OR ABSENCE OF DISTRIBUTED POWER SUPPLY | MEASURED POWER (LOAD + DOWNSTREAM LOAD − GENERATED POWER) [kW] |
|---|---|---|---|---|---|---|
| | RATED CAPACITY [kWh] | CHARGING AND DISCHARGING PERFORMANCE [kW] | SOC [%] | | | |
| 001 (FIRST) | 15 | 3 | 50 | DISCHARGING | PRESENT | 1 (=3+(4+0)−6) |
| 002 (SECOND) | 10 | 2 | 80 | DISCHARGING | ABSENT | 4 (=4+0(NONE)−0(NONE)) |
| 003 (THIRD) | 7 | 1.5 | 30 | CHARGING | PRESENT | 0 (=−3+0(NONE)−−3) |

FIG. 9

| ELECTRICITY STORAGE SYSTEM ID | STATE INFORMATION | | | | LOAD [kW] | DISTRIBUTED POWER SUPPLY [kW] |
|---|---|---|---|---|---|---|
| | RATED CAPACITY [kWh] | CHARGING AND DISCHARGING PERFORMANCE [kW] | SOC [%] | DIRECTION INFORMATION | | |
| 001 (FIRST) | 15 | 3 | 70 | DISCHARGING | 3 | 6 |
| 002 (SECOND) | 10 | 2 | 30 | CHARGING | 4 | NONE |
| 003 (THIRD) | 7 | 1.5 | 90 | CHARGING | 1 | 3 |

FIG. 10

| ELECTRICITY STORAGE SYSTEM ID | STATE INFORMATION | | | DIRECTION INFORMATION | LOAD [kW] | DISTRIBUTED POWER SUPPLY [kW] |
|---|---|---|---|---|---|---|
| | RATED CAPACITY [kWh] | CHARGING AND DISCHARGING PERFORMANCE [kW] | SOC [%] | | | |
| 001 (FIRST) | 15 | 3 | 50 | DISCHARGING | 5 | 4 |
| 002 (SECOND) | 10 | 2 | 80 | DISCHARGING | 3 | NONE |
| 003 (THIRD) | 7 | 1.5 | 30 | CHARGING | 2 | 3 |

DISTRIBUTED ELECTRICITY STORAGE SYSTEM, POWER CONTROL METHOD, AND PROGRAM

CROSS-REFERENCE TO RELATED PATENT APPLICATIONS

This application is a National Stage Entry of International Application No. PCT/JP2016/058915, filed Mar. 22, 2016, which claims priority from Japanese Patent Application No. 2015-067118, filed Mar. 27, 2015. The entire contents of the above-referenced applications are expressly incorporated herein by reference.

TECHNICAL FIELD

The present invention relates to a distributed electricity storage system, a power control method, and a program.

BACKGROUND ART

Electricity storage apparatuses interlocked with system power are used for the purpose of a reduction in power costs, a stable power supply, or the like.

The following Patent Document 1 discloses an example of a technique related to an electricity storage apparatus interlocked with system power. The following Patent Document 1 discloses a storage battery facility (electricity storage apparatus) including a plurality of storage batteries, and a technique of controlling a linking point tide without any interruption by charging and discharging the storage batteries in accordance with a tidal signal of a power system, with one of the plurality of storage batteries used for discharging and the remaining storage batteries used for charging.

RELATED DOCUMENT

Patent Document

[Patent Document 1] Japanese Unexamined Patent Application Publication No. 2008-099527

SUMMARY OF THE INVENTION

Technical Problem

For example, in a building or the like having a plurality of stores or dwelling units, a plurality of electricity storage apparatuses may be installed on the same distribution line for use in each of the plurality of stores or dwelling units. Although the plurality of electricity storage apparatuses are provided on the same distribution line, generally, the electricity storage apparatuses are individually charged and discharged for each control function and schedule, in accordance with various situations such as power used by a load corresponding to each electricity storage apparatus and power generated by a separately-provided solar power generation apparatus or the like. In such a case, the charging and discharging operation of an electricity storage apparatus may deteriorate the battery life.

The present invention provides a technique allowing to suppress deterioration in the battery life of an electricity storage apparatus in a distributed electricity storage system including a plurality of electricity storage apparatuses.

Solution to Problem

According to the present invention, there is provided a distributed electricity storage system including: a plurality of electricity storage apparatuses connected to a same distribution line; a determination unit that determines excess or deficient power in the distribution line; an acquisition unit that acquires, with respect to each of the plurality of electricity storage apparatuses, state information indicating a state of an electricity storage apparatus and direction information indicating an operating direction of a charging direction or a discharging direction; and a selection unit that selects an electricity storage apparatus to be controlled in charging and discharging operations from the plurality of electricity storage apparatuses, using a determination result of the excess or deficient power, the state information, and the direction information.

There is provided a power control method executed in a distributed electricity storage system including a plurality of electricity storage apparatuses connected to a same distribution line, the method performed by a computer included in the distributed electricity storage system including: determining excess or deficient power in the distribution line; acquiring, with respect to each of the plurality of electricity storage apparatuses, state information indicating a state of an electricity storage apparatus and direction information indicating an operating direction of a charging direction or a discharging direction; and selecting an electricity storage apparatus to be controlled in charging and discharging operations from the plurality of electricity storage apparatuses, using a determination result of the excess or deficient power, the state information, and the direction information.

According to the present invention, there is provided a program executed in a distributed electricity storage system including a plurality of electricity storage apparatuses connected to a same distribution line, the program causing a computer included in the distributed electricity storage system to function as: a determination unit that determines excess or deficient power in the distribution line; an acquisition unit that acquires, with respect to each of the plurality of electricity storage apparatuses, state information indicating a state of an electricity storage apparatus and direction information indicating an operating direction of a charging direction or a discharging direction; and a selection unit that selects an electricity storage apparatus to be controlled in charging and discharging operations from the plurality of electricity storage apparatuses, using a determination result of the excess or deficient power, the state information, and the direction information.

Advantageous Effects of the Invention

According to the present invention, it is possible to suppress a deterioration in the battery life of an electricity storage apparatus in a distributed electricity storage system including a plurality of electricity storage apparatuses.

BRIEF DESCRIPTION OF THE DRAWINGS

The above and other objects, features and advantages will be made clearer from certain preferred exemplary embodiments described below, and the following accompanying drawings.

FIG. 5 is a diagram illustrating a specific operation example during excess power in the first exemplary embodiment.

FIG. 6 is a diagram illustrating a specific operation example during power deficit in the first exemplary embodiment.

FIG. 9 is a diagram illustrating a specific operation example during excess power in the second exemplary embodiment.

FIG. 10 is a diagram illustrating a specific operation example during deficient power in the first exemplary embodiment.

DESCRIPTION OF EMBODIMENTS

Figure 1:
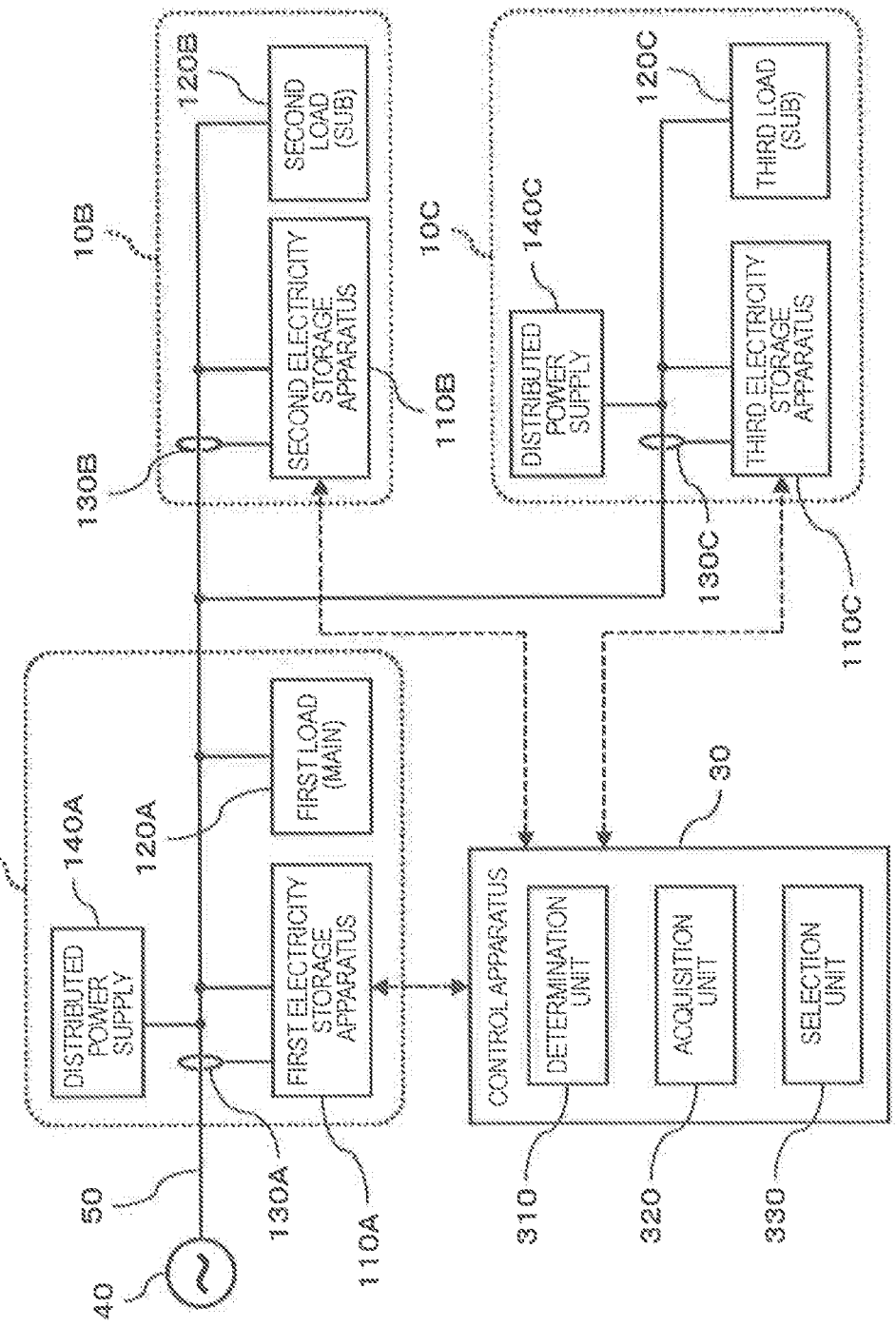
FIG. 1 is a block diagram conceptually illustrating a process configuration of a distributed electricity storage system in a first exemplary embodiment.

Hereinafter, exemplary embodiments of the present invention will be described with reference to the accompanying drawings. In all the drawings, like elements are referenced by like reference numerals and the descriptions thereof will not be repeated.

First Exemplary Embodiment

[Process Configuration]

FIG. 1 is a block diagram conceptually illustrating a process configuration of a distributed electricity storage system 1 in a first exemplary embodiment. As shown in FIG. 1, the distributed electricity storage system 1 of the present exemplary embodiment includes a first electricity storage system 10A, a second electricity storage system 10B, and a third electricity storage system 10C. Note that the configuration of the distributed electricity storage system 1 is not limited to an example of the drawing. In addition, for example, other electricity storage systems which are not shown in the drawing may be further connected in series or in parallel to the second electricity storage system 10B or the third electricity storage system 10C.

In the present exemplary embodiment, the first electricity storage system 10A includes a first electricity storage apparatus 110A and a first load 120A. In addition, in the present exemplary embodiment, with a system 40 on the upstream side, the first electricity storage system 10A includes a current transformer 130A further upstream than positions at which the first electricity storage apparatus 110A and the first load 120A are connected to a distribution line 50. Similarly to the first electricity storage system 10A, the second electricity storage system 10B and the third electricity storage system 10C also each include an electricity storage apparatus, a load, and a current transformer.

As shown in FIG. 1, the first electricity storage apparatus 110A, the second electricity storage apparatus 110B, and the third electricity storage apparatus 110C are connected to the same distribution line 50. Here, "the same distribution line" can be defined as a series of electrically connected distribution lines which are present at the downstream side from a connection point with the system 40, with the system 40 on the upstream side. In addition, "the same distribution line" can also be defined as a series of distribution lines which are present in a range interposed between certain transformers. Note that, in this case, at a terminal portion, the transformers are located only on the upstream side. In addition, in the present exemplary embodiment, the first electricity storage apparatus 110A is provided in order to supply power mainly to the first load 120A which is a main load. In addition, the second electricity storage apparatus 110B is provided in order to supply power mainly to a second load 120B which is a subload. In addition, the third electricity storage apparatus 110C is provided for supplying power mainly to a third load 120C which is a subload.

Here, the "main load" refers to, for example, a load (such as, for example, shared illumination, an elevator, or network equipment of a tenant building) or the like which is installed in a shared portion of a building such as a tenant building. In addition, the "subload" refers to, for example, a load (such as, for example, illumination possessed by a tenant or an OA instrument which is used in each tenant space) or the like which is installed for each floor or compartment of the building. However, the application of the distributed electricity storage system 1 is not limited to this example.

In addition, each electricity storage system may further include distributed power supplies (140A and 140C) as in the first electricity storage system 10A and the third electricity storage system 10C. The distributed power supply is, for example, a power generation apparatus that generates power using sunlight, wind power, gas or the like.

In addition, the distributed electricity storage system 1 of the present exemplary embodiment further includes a control apparatus 30 that controls charging and discharging operations of the first electricity storage apparatus 110A, the second electricity storage apparatus 110B, and the third electricity storage apparatus 110C. The control apparatus 30 includes a determination unit 310, an acquisition unit 320, and a selection unit 330. The control apparatus 30 is communicably connected to the first electricity storage apparatus 110A, the second electricity storage apparatus 110B, and the electricity storage apparatus 110C in a wired or wireless manner.

The determination unit 310 determines the state of excess or deficient power (excess power state or power deficit state) of the distribution line 50. The excess power state refers to a state where the sum of power generated by each distributed power supply connected to the distribution line 50 exceeds the sum of power required in each load connected to the distribution line 50 and power used in charging each of the electricity storage apparatus. In addition, the power deficit state refers to a state where the sum of power generated by each distributed power supply connected to the distribution line 50 falls below the sum of power required in each load connected to the distribution line 50 and power used in charging each electricity storage apparatus.

In the configuration shown in FIG. 1, the current transformer 130A measures the current of the entire distributed electricity storage system 1. In the example of FIG. 1, the determination unit 310 acquires the direction or magnitude of the current measured by the current transformer 130A through the first electricity storage apparatus 110A, for example, at a predetermined interval, and thus can determine the state of excess or deficient power in the distribution line 50.

The acquisition unit 320 acquires, with respect to each of a plurality of electricity storage apparatuses, state information indicating the state of the electricity storage apparatus and direction information indicating the operating direction of a charging direction or a discharging direction. The acquisition unit 320 acquires the state information and the direction information of each electricity storage apparatus, for example, in accordance with a timing at which the excess power state or the power deficit state is detected by the determination unit 310.

The direction information of each electricity storage apparatus may be, for example, individually managed by each electricity storage apparatus, and may be centrally managed by the control apparatus 30. The direction information of the electricity storage apparatus is controlled by, for example, the history of charging and discharging operations in the electricity storage apparatus and the SOC or voltage of the electricity storage apparatus. Specifically, an electricity storage apparatus of which the direction information is a "charging direction" is treated as an electricity storage apparatus for a charging operation, and the direction information of the electricity storage apparatus is switched to a "discharging direction" in a case where the SOC or voltage of the electricity storage apparatus reaches the upper limit of a predetermined range by the charging operation. In addition, an electricity storage apparatus of which the direction information is a "discharging direction" is treated as an electricity storage apparatus for a discharging operation, and the direction information of the electricity storage apparatus is switched to a "charging direction" in a case where the SOC or voltage of the electricity storage apparatus reaches the lower limit of a predetermined range by the discharging operation. Basically, since it is preferable to repeat charging and discharging with a high depth rather than to repeat charging and discharging with a low depth from the viewpoint of battery life, such a "predetermined range" is set to have a certain level of depth.

The state information is information which can be used as an index for determining the degree of priority of each electricity storage apparatus when selecting an electricity storage apparatus to perform a charging operation or a discharging operation. Examples of the state information include, for example, the capacity of an electricity storage apparatus, the charging and discharging performance of the electricity storage apparatus, the degree of deterioration of the electricity storage apparatus, a distance from the electricity storage apparatus to a power deficient load, and the like. However, the state information is not limited to these examples. In addition, the term "capacity" as used herein refers to the residual capacity or available capacity of the electricity storage apparatus. The residual capacity of the electricity storage apparatus can be calculated using, for example, the state of charge (SOC) of the electricity storage apparatus which is measured separately from the rated capacity of the electricity storage apparatus. In addition, the available capacity of the electricity storage apparatus can be calculated using, for example, the rated capacity and the residual capacity of the electricity storage apparatus. The state information may be, for example, individually managed by each electricity storage apparatus or may be centrally managed by the control apparatus 30. The capacity of the electricity storage apparatus can be calculated by monitoring an integrated current value during charging and discharging of each electricity storage apparatus or a voltage value at a certain point in time. The charging and discharging performance of the electricity storage apparatus is, for example, a rated value, and is previously stored in a storage unit, not shown, of each electricity storage apparatus or the control apparatus 30. In addition, the degree of deterioration of the electricity storage apparatus is, for example, the number of cycles of charging and discharging of the electricity storage apparatus, or the like, and the number of cycles for each electricity storage apparatus is held in a storage unit, not shown, of each electricity storage apparatus or the control apparatus 30. In addition, the distance from the electricity storage apparatus to the load can be calculated using the positions (distances) of each electricity storage apparatus and each load when seen from a certain reference point in the distributed electricity storage system 1, for example, by previously holding the positions in the storage unit, or the like. Note that the power deficient load can be determined using information (direction and magnitude of a current) which is measured by a current transformer included in each electricity storage system. In addition, a current transformer which is not shown in the drawing is further provided before each load, and thus it is also possible to determine a power deficient load.

The selection unit 330 selects an electricity storage apparatus to be controlled in charging and discharging operations from a plurality of electricity storage apparatuses, using the determination result of the determination unit 310 of excess or deficient power and the state information and the direction information of each electricity storage apparatus which are acquired by the acquisition unit 320. Note that the selection unit 330 may select an electricity storage apparatus to be controlled in charging and discharging operations in accordance with the degree of priority which is set in advance.

Note that each component shown in FIG. 1 is embodied by any combination of hardware and software based on a CPU and a memory of any computer, a program, loaded into the memory, for implementing each component shown in the drawing, storage media such as a hard disk having the program stored thereon, and an interface for network connection. Embodying methods and apparatuses thereof may be modified in various ways.

Operation Example

Figure 2:
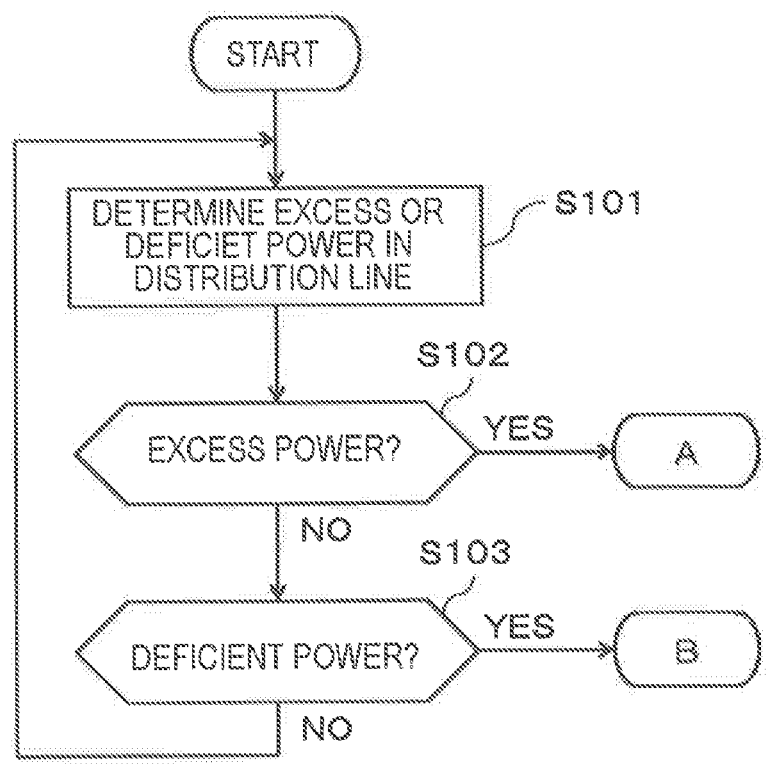
FIG. 2 is a flow diagram illustrating a processing flow of determining the state of excess or deficient power in the distributed electricity storage system of the first exemplary embodiment.
Figure 3:
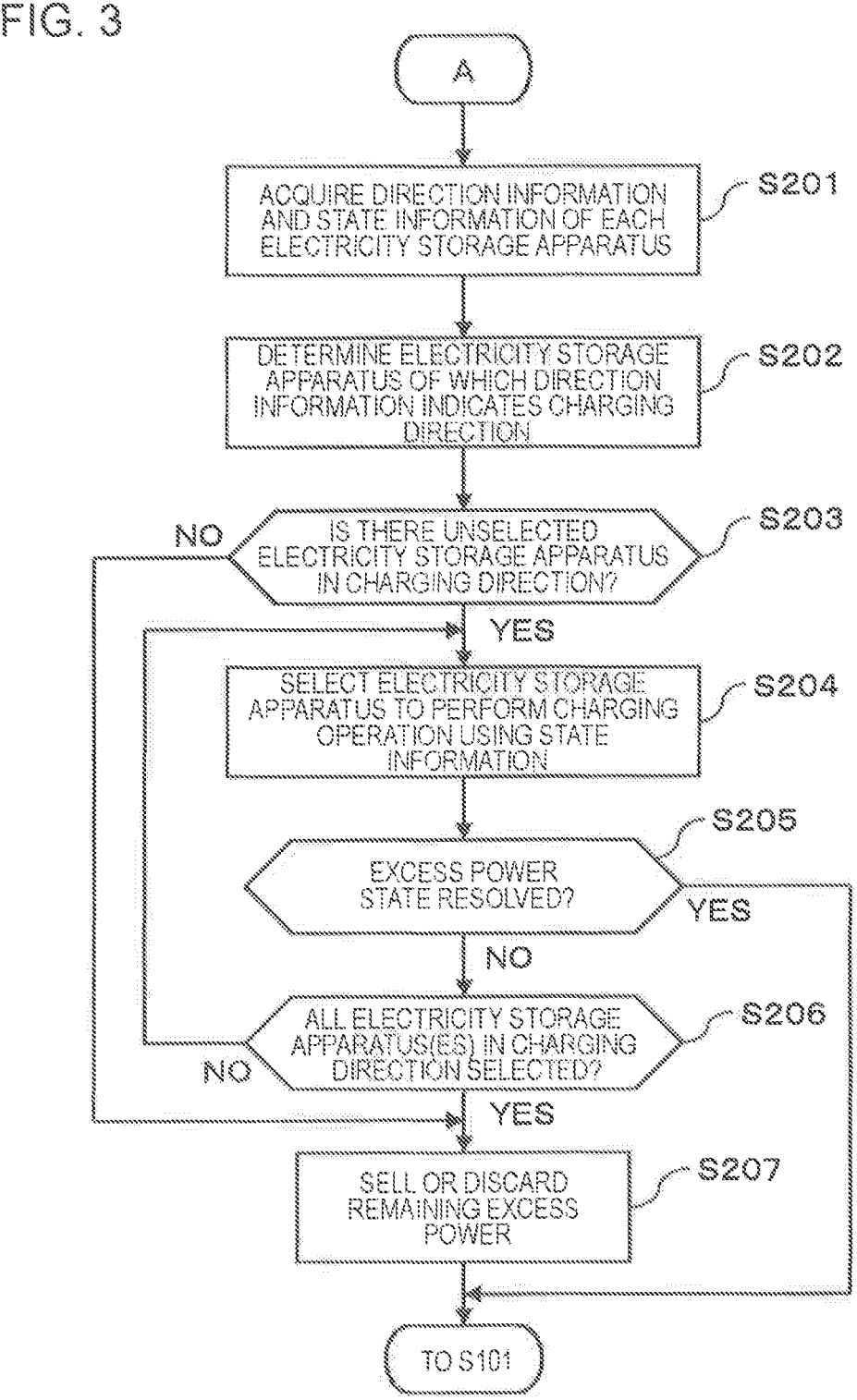
FIG. 3 is a flow diagram illustrating a processing flow during excess power in the distributed electricity storage system of the first exemplary embodiment.
Figure 4:
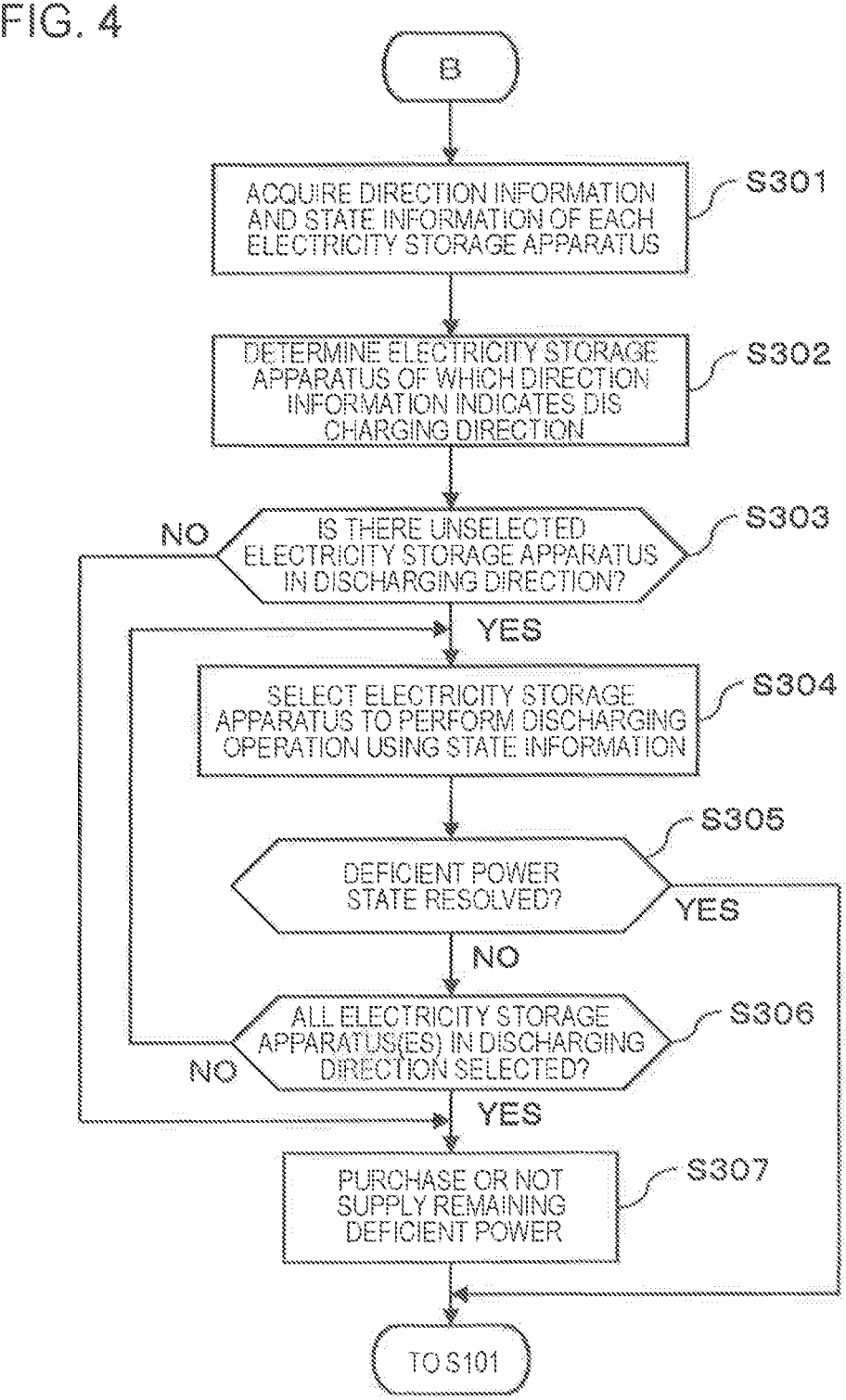
FIG. 4 is a flow diagram illustrating a processing flow during power deficit in the distributed electricity storage system of the first exemplary embodiment.

The operation example of the distributed electricity storage system 1 in the present exemplary embodiment will be described with reference to FIGS. 2 to 4. FIG. 2 is a flow diagram illustrating a processing flow of determining the state of excess or deficient power in the distributed electricity storage system of the first exemplary embodiment.

First, the determination unit 310 determines the state of excess or deficient power in the distribution line 50 (S101). The determination unit 310 can detect an excess power state where power is excessive in the entire distributed electricity storage system 1 or a power deficit state where there power is deficient in the entire distributed electricity storage system 1, from the direction of a current measured by the current transformer 130A. For example, in a case where the direction of a current measured by the current transformer 130A is from the upstream side to the downstream side with the system 40 on the upstream side, the determination unit 310 can determine a power deficit state in the distribution line 50. On the other hand, in a case where the direction of a current measured by the current transformer 130A is from the downstream side to the upstream side with the system 40 on the upstream side, the determination unit 310 can determine an excess power state in the distribution line 50. In addition, the determination unit 310 can calculate the excess amount or the deficient amount of power in the entire distributed electricity storage system 1, using the magnitude of a current measured by the current transformer 130A. For example, since power supplied from the system 40 is supplied at a constant effective value voltage, the determination unit 310 can calculate excess power or deficient power by multiplying the effective value voltage and the current measured by 130A. In a case where it is determined that power is in excess in the distribution line 50 (S102: YES), a process A described later is executed. In addition, in a case where it is determined that power is deficient in the distribution line 50 (S103: YES), a process B described later is executed. In addition, in a case where power is neither in excess nor in deficiency in the distribution line 50, the determination unit 310 repeats the determination of S101, for example, at a predetermined interval.

<Process A: Process During Excess Power>

A process during excess power will be described with reference to FIG. 3. FIG. 3 is a flow diagram illustrating a processing flow during excess power in the distributed electricity storage system of the first exemplary embodiment.

The acquisition unit 320 acquires direction information and state information of each electricity storage apparatus (S201). Next, the selection unit 330 uses the direction information acquired by the acquisition unit 320 to determine an electricity storage apparatus of which the direction information indicates a charging direction (S202). The selection unit 330 determines whether an unselected electricity storage apparatus is present as an electricity storage apparatus of which the direction information indicates a charging direction and which performs a charging operation (S203).

In a case where no unselected electricity storage apparatus is present as an electricity storage apparatus of which the direction information indicates a charging direction and which performs a charging operation (S203: NO), the selection unit 330 does not execute a process of selecting an electricity storage apparatus which performs a charging operation, as described later. In this case, the control apparatus 30 attempts to resolve an excess power state, for example, by selling or discarding the remaining excess power (S207). On the other hand, in a case where an unselected electricity storage apparatus is present as an electricity storage apparatus of which the direction information indicates a charging direction and which performs a charging operation (S203: YES), the selection unit 330 selects an electricity storage apparatus to perform a charging operation (S204). The selection unit 330 determines the degree of priority of each electricity storage apparatus using, for example, the state information such as the available capacity or the charging performance of each electricity storage apparatus, and selects an electricity storage apparatus which performs a charging operation.

The selection unit 330 determines whether the excess power state would be resolved by the charging operation of the selected electricity storage apparatus(es) (S205). The selection unit 330 compares, for example, an excess power value with the charging performance of the selected electricity storage apparatus(es), and thus can determine whether the excess power state would be resolved by the charging operation of the electricity storage apparatus(es). Specifically, the selection unit 330 may determine that the power excess state can be resolved when the charging performance of the selected electricity storage apparatus(es) is equal to or greater than the excess power value.

In a case where the excess power state can be resolved (S205: YES), the control apparatus 30 transmits an instruction for starting a charging operation to the selected electricity storage apparatus(es), and terminates the process. On the other hand, in a case where the excess power state cannot be resolved (S205: NO), the selection unit 330 determines whether all electricity storage apparatuses of which the direction information indicates a charging direction have been selected (S206).

In a case where an unselected electricity storage apparatus is present among the electricity storage apparatus(es) of which the direction information indicates a charging direction (S206: NO), that is, in a case where an electricity storage apparatus capable of adjusting excess power is still present, the selection unit 330 repeats the process from S204 described above. On the other hand, in a case where all the electricity storage apparatuses of which the direction information indicates a charging direction have been selected (S206: YES), that is, in a case where the excess power state is not resolved even when all the electricity storage apparatuses of which the direction information indicates a charging direction are charged, the control apparatus 30 steps out of the repeating process and transmits an instruction for starting a charging operation to each selected electricity storage apparatus. In addition, in this case, the control apparatus 30 attempts to resolve the excess power state by selling or discarding the remaining excess power (S207).

In addition, in a case where a plurality of electricity storage apparatuses are selected by the selection unit 330 in the above-described flow, the control apparatus 30 transmits, to each electricity storage apparatus, for example, an instruction for charging each electricity storage apparatus to the maximum value of its charging performance in the selected order, and matching the sum of charging power of each electricity storage apparatus with the excess power by the charging power of the lastly-selected electricity storage apparatus. In addition, the control apparatus 30 may transmit an instruction for setting a value as the charging power in the charging operation of each electricity storage apparatus, the value obtained by multiplying a ratio, calculated by dividing the excess power by a total sum of maximum values of the charging performance of the selected electricity storage apparatuses, and the maximum value of the charging performance of each electricity storage apparatus.

After the termination of the process A, the process returns to S101, and the control apparatus 30 continues to monitor the excess or deficit state of power in the distribution line 50.

<Process B: Process During Power Deficit>

A process during power deficit will be described with reference to FIG. 4. FIG. 4 is a flow diagram illustrating a processing flow during power deficit in the distributed electricity storage system of the first exemplary embodiment.

The acquisition unit 320 acquires direction information and state information of each electricity storage apparatus (S301). Next, the selection unit 330 determines an electricity storage apparatus of which the direction information indicates a discharging direction, using the direction information acquired by the acquisition unit 320 (S302). The selection unit 330 determines whether an unselected electricity storage apparatus is present as an electricity storage apparatus of which the direction information indicates a discharging direction and which performs a discharging operation (S303).

In a case where no unselected electricity storage apparatus is present as an electricity storage apparatus of which the direction information indicates a discharging direction and which performs a discharging operation (S303: NO), the selection unit 330 does not execute a process of selecting an electricity storage apparatus which performs a discharging operation, as described later. In this case, the control apparatus 30 processes the deficient power, for example, as follows. Specifically, the control apparatus 30 may execute control so as to purchase the deficient power from a system, or may not supply the remaining deficient power in some cases (S307). On the other hand, in a case where an unselected electricity storage apparatus is present as an electricity storage apparatus of which the direction information indicates a discharging direction and which performs a discharging operation (S303: YES), the selection unit 330 selects an electricity storage apparatus which performs a discharging operation (S304). The selection unit 330 determines the degree of priority of each electricity storage apparatus using, for example, state information such as the dischargeable capacity or discharging performance of each electricity storage apparatus, to select an electricity storage apparatus which performs a discharging operation.

The selection unit 330 determines whether the power deficit state would be resolved by the discharging operation of the selected electricity storage apparatus(es) (S305). The selection unit 330 compares, for example, the value of deficient power with the discharging performance (discharging power value) of the selected electricity storage apparatus(es), and thus can determine whether the power deficit state can be resolved by the discharging operation of the electricity storage apparatus(es). Specifically, the selection unit 330 may determine that the power deficit state can be resolved in a case where the discharging performance (discharging power value) of the selected electricity storage apparatus(es) is equal to or greater than the value of deficient power.

In a case where the power deficit state is to be resolved (S305: YES), the control apparatus 30 transmits an instruction for starting a discharging operation to the selected electricity storage apparatus(es), and terminates the process. On the other hand, in a case where the power deficit state is not to be resolved (S305: NO), the selection unit 330 determines whether all electricity storage apparatuses of which the direction information indicates a discharging direction have been selected (S306).

In a case where an unselected electricity storage apparatus is present among the electricity storage apparatuses of which the direction information indicates a discharging direction (S306: NO), that is, in a case where an electricity storage apparatus capable of adjusting deficient power is still present, the selection unit 330 repeats the process from S304 described above. On the other hand, in a case where all the electricity storage apparatuses of which the direction information indicates a discharging direction have been selected (S306: YES), that is, in a case where the power deficit state cannot be resolved even when all the electricity storage apparatuses of which the direction information indicates a discharging direction are discharged, the control apparatus 30 steps out of the repeating operation and transmits an instruction for starting a discharging operation to the selected electricity storage apparatus(es). In addition, the control apparatus 30 may execute control for purchasing the remaining deficient power from the system, or may not supply the remaining deficient power in some cases (S307).

In addition, in a case where a plurality of electricity storage apparatuses are selected by the selection unit 330 in the above-described flow, the control apparatus 30 transmits, to each electricity storage apparatus, for example, an instruction for discharging each electricity storage apparatus to the maximum value of its discharging performance in the selected order, and matching the sum of discharging power of each electricity storage apparatus with the deficient power by the discharging power of the lastly-selected electricity storage apparatus. In addition, the control apparatus 30 may transmit an instruction for setting a value as the discharging power in the discharging operation of each electricity storage apparatus, the value obtained by multiplying a ratio, calculated by dividing the deficient power by a total sum of maximum values of the discharging performance of the selected electricity storage apparatuses, and the maximum value of the discharging performance of each electricity storage apparatus.

After the termination of the process B, the process returns to S101, and the control apparatus 30 continues to monitor the state of excess or deficient power in the distribution line 50.

Operation and Effect of First Exemplary Embodiment

As stated above, in the present exemplary embodiment, in a case where an excess power state is detected in the distribution line 50 connecting the respective electricity storage apparatuses included in the distributed electricity storage system 1, the charging operation of the electricity storage apparatus(es) of which the direction information indicates a "charging direction" among the respective electricity storage apparatuses is executed. In addition, in a case where the power deficit state is detected in the distribution line 50 connecting the respective electricity storage apparatuses included in the distributed electricity storage system 1, the discharging operation of the electricity storage apparatus(es) of which the direction information indicates a "discharging direction" among the respective electricity storage apparatuses is executed. In addition, the direction information of each electricity storage apparatus is switched, for example, in a predetermined SOC or in a range of a voltage, and the charging and discharging operations of each electricity storage apparatus is controlled so that the SOC or voltage of each electricity storage apparatus is reciprocated in a predetermined range. As a result, as compared with a case where the charging and discharging operations of electricity storage apparatuses are individually controlled in units of electricity storage systems, it is possible to suppress an operation that deteriorates the battery life of each electricity storage apparatus (such as, for example, operation in which charging and discharging having a low depth are repeated).

Specific Examples of First Exemplary Embodiment

Hereinafter, the respective exemplary embodiments stated above will be described in more detail by way of specific examples. The present invention is not limited to the following specific examples.

<Process During Excess Power>

A flow of the process A of the first exemplary embodiment, will be described with reference to the example of FIG. 5. FIG. 5 is a diagram illustrating a specific operation example during excess power in the first exemplary embodiment. In the example of FIG. 5, the first row indicates information of the first electricity storage system 10A, the second row indicates information of the second electricity storage system 10B, and the third row indicates information of the third electricity storage system 10C. The pieces of information exemplified in FIG. 5 are, for example, centrally managed by the control apparatus 30.

The electricity storage system ID is information for uniquely identifying each electricity storage system. State information is information indicating the state of an electricity storage apparatus of each electricity storage system. In the present example, the state information is exemplified by rated capacity, charging and discharging performance, and SOC. However, the state information is not limited to the present example. Direction information is information indicating which of a charging direction and a discharging direction each electricity storage system is directed to. Measured power is calculated for each electricity storage system from the measurement results of the current transformers (130A, 130B, 130C) included in each electricity storage system. Each current transformer is capable of measuring power required by a load which is connected at the downstream side thereof. Note that, in a case where an electricity storage apparatus is performing a charging operation, the electricity storage apparatus can be regarded as a load when seen from the current transformer 130A. In the configuration of the first exemplary embodiment, the measured power in the current transformer 130A indicates the state of excess or deficient power of the entire distributed electricity storage system 1, and the measured power in the current transformer 130B and the current transformer 130C indicates the state of excess or deficient power of the second electricity storage system 10B and the third electricity storage system 10C. The SOC or the measured power is acquired by each electricity storage apparatus, for example, at a predetermined interval, and is transmitted to the control apparatus 30.

In the example of FIG. 5, the determination unit 310 determines that power is in excess of 2 [kW] in the distribution line 50, on the basis of the measured power in the current transformer 130A. The acquisition unit 320 acquires the direction information and the state information (rated capacity, charging and discharging performance, and SOC) of each electricity storage apparatus of each electricity storage system.

The selection unit 330 selects an electricity storage apparatus that executes a charging operation on the basis of the acquired pieces of information. In the example of FIG. 5, since the direction information of the second electricity storage apparatus 110B and the third electricity storage apparatus 110C is "charging", the selection unit 330 determines the second electricity storage apparatus 110B and the third electricity storage apparatus 110C as candidates for executing a charging operation. Further, the selection unit 330 determines the degrees of priority of the second electricity storage apparatus 110B and the third electricity storage apparatus 110C on the basis of the state information (rated capacity, charging and discharging performance, and SOC), and selects an electricity storage apparatus having a higher degree of priority as an electricity storage apparatus to perform a charging operation. The selection unit 330 determines the second electricity storage apparatus 110B having a large available capacity to be an electricity storage apparatus having a higher degree of priority, for example, on the basis of the rated capacity and the SOC.

The selection unit 330 determines that the charging performance (2 [kW]) of the second electricity storage apparatus 110B is equal to the excess power (2 [kW]), and that the excess power state can be resolved by the charging operation of the second electricity storage apparatus 110B.

In this case, the control apparatus 30 transmits a command for executing a charging operation of for the excess 2 [kW] to the second electricity storage apparatus 110B. The second electricity storage apparatus 110B starts a charging operation at 2 [kW], and the excess power state is resolved.

Note that, in a case where the charging performance of the second electricity storage apparatus 110B falls below the excess power, the selection unit 330 further transmits an execution instruction to the third electricity storage apparatus 110C to perform a charging operation for adjusting the remaining excess power. In a case where the excess power state is not resolved even by the charging operation of the third electricity storage apparatus 110C, the control apparatus 30 executes control for selling the remaining excess power to the system 40 or discarding the power.

<Process During Power Deficit>

A flow of the process B of the first exemplary embodiment will be described with reference to an example of FIG. 6. FIG. 6 is a diagram illustrating a specific operation example during power deficit in the first exemplary embodiment. In the example of FIG. 6, the first row indicates information of the first electricity storage system 10A, the second row indicates information of the second electricity storage system 10B, and the third row indicates information of the third electricity storage system 10C. The pieces of information exemplified in FIG. 6 are the same as the pieces of information of FIG. 5, and are, for example, centrally managed by the control apparatus 30.

In the example of FIG. 6, the determination unit 310 determines that power of 1 [kW] is deficient in the distribution line 50, on the basis of the measured power in the current transformer 130A. The acquisition unit 320 acquires the direction information and the state information (rated capacity, charging and discharging performance, and SOC) of each electricity storage apparatus of each electricity storage system.

The selection unit 330 selects an electricity storage apparatus that executes a discharging operation on the basis of the acquired information. In the example of FIG. 6, since the direction information of the first electricity storage apparatus 110A and the second electricity storage apparatus 110B is "discharging", the selection unit 330 determines the first electricity storage apparatus 110A and the second electricity storage apparatus 110B as candidates that execute a discharging operation. The selection unit 330 determines the degrees of priority of the first electricity storage apparatus 110A and the second electricity storage apparatus 110B on the basis of the state information (rated capacity, charging and discharging performance, and SOC), and selects an electricity storage apparatus having a higher degree of priority as an electricity storage apparatus performing a discharging operation. The selection unit 330 determines the second electricity storage apparatus 110B having a large residual capacity to be an electricity storage apparatus having a higher degree of priority, for example, on the basis of the rated capacity and the SOC.

Since the charging performance (2 [kW]) of the second electricity storage apparatus 110B exceeds the deficient power (1 [kW]), the selection unit 330 determines that the power deficit state can be resolved by the discharging operation of the second electricity storage apparatus 110B. In this case, the control apparatus 30 transmits a command for executing a discharging operation for the deficient 1 [kW] to the second electricity storage apparatus 110B. The second electricity storage apparatus 110B starts a discharging operation at 1 [kW], and the power deficit state is resolved.

Note that, in a case where the discharging performance of the second electricity storage apparatus 110B falls below the deficient power, the selection unit 330 further transmits an execution instruction to the third electricity storage apparatus 110C for a discharging operation for adjusting the remaining deficient power. In a case where the power deficit state is not resolved even by the charging operation of the third electricity storage apparatus 110C, the control apparatus 30 executes control for purchasing the remaining deficient power from the system 40 or not supplying the power in some cases.

Modification Example of First Exemplary Embodiment

Figure 7:
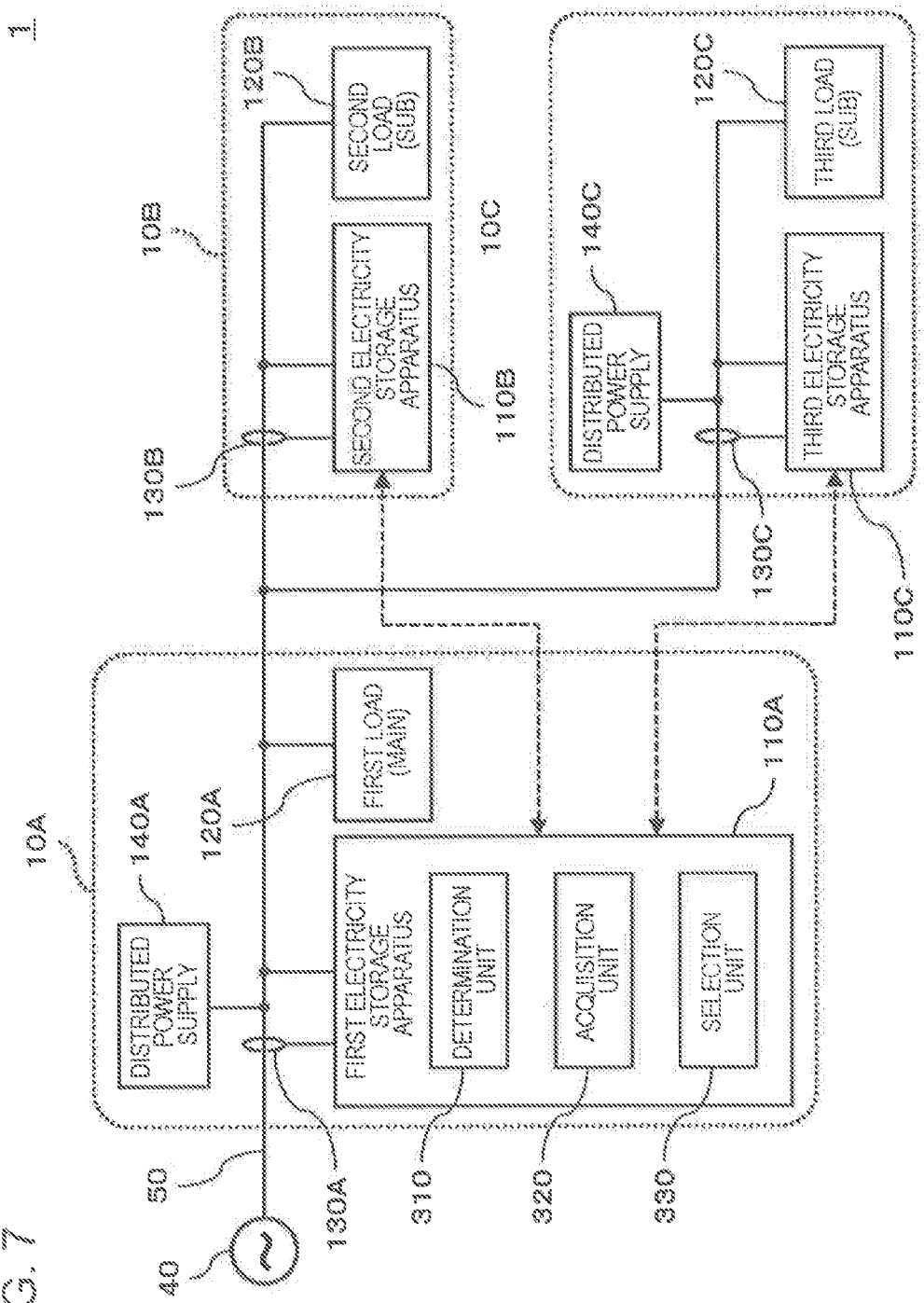
FIG. 7 is a diagram illustrating a configuration example of a distributed electricity storage system in a modification example of the first exemplary embodiment.

FIG. 7 is a diagram illustrating a configuration example of a distributed electricity storage system 1 in a modification example of the first exemplary embodiment. As shown in FIG. 7, one (first electricity storage apparatus 110A in the drawing) of a plurality of electricity storage apparatuses which are connected to the same distribution line 50 may include the determination unit 310, the acquisition unit 320, and the selection unit 330 which are described above. In this case, the electricity storage apparatus including the determination unit 310, the acquisition unit 320, and the selection unit 330 also functions as the above-described control apparatus 30. The present configuration also allows to obtain the above-described effect.

Second Exemplary Embodiment

Figure 8:
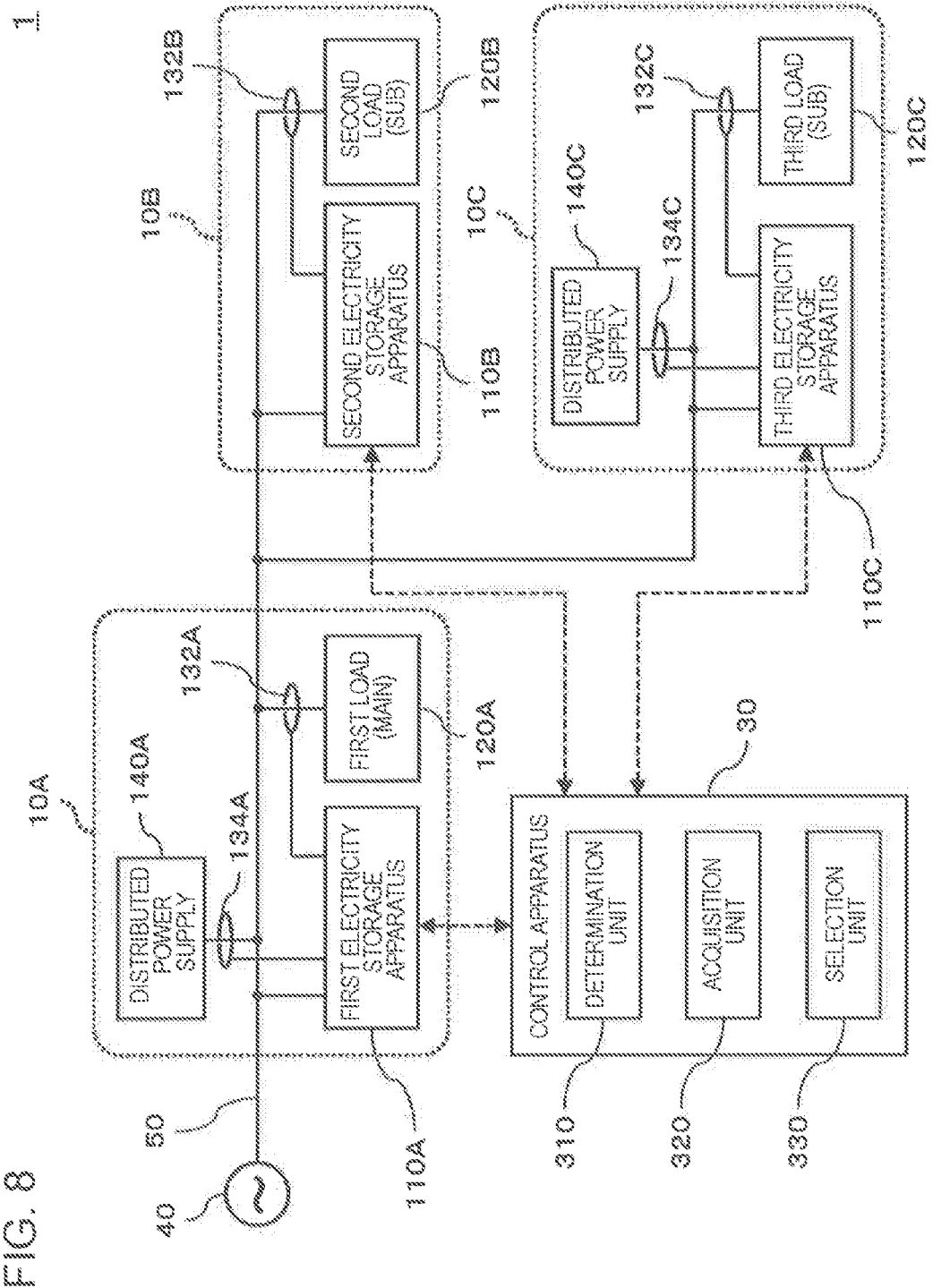
FIG. 8 is a block diagram conceptually illustrating a process configuration of a distributed electricity storage system in a second exemplary embodiment.

[Process Configuration]
FIG. 8 is a block diagram conceptually illustrating a process configuration of a distributed electricity storage system 1 in a second exemplary embodiment. In the present exemplary embodiment, the way of connecting current transformers is different from that of the configuration of the first exemplary embodiment. In the present exemplary embodiment, each load (120A, 120B, 120C) and each distributed power supply (140A, 140C) are provided with current transformers (132A, 134A, 132B, 132C, 134C), respectively.

In the configuration of FIG. 8, the current transformers (132A, 132B, 132C) provided to each load can be used as information indicating power required in each load. In addition, information measured in the current transformers (134A, 134C) provided to each distributed power supply can be used as information indicating power generated by each distributed power supply. That is, the determination unit 310 of the present exemplary embodiment can determine the state of excess or deficient power in the distribution line 50, using the information measured in each of the current transformers (132A, 134A, 132B, 132C, 134C). As is the case with the first exemplary embodiment, the process A during excess power or the process B during power deficit is executed in accordance with the determination result of the determination unit 310.

Operation and Effect of Second Exemplary Embodiment

As stated above, as is the case with the first exemplary embodiment, the distributed electricity storage system 1 of the present exemplary embodiment can also control the charging and discharging operations of each electricity storage apparatus. Thus, in the present exemplary embodiment, it is also possible to obtain the same effect as that in the first exemplary embodiment.

Specific Examples of Second Exemplary Embodiment

Hereinafter, the respective exemplary embodiments stated above will be described in more detail by way of specific examples. The present invention is not limited to the following specific examples.

<Process During Excess Power>
A flow of the process A of the second exemplary embodiment will be described with reference to an example of FIG. 9. FIG. 9 is a diagram illustrating a specific operation example during excess power in the second exemplary embodiment. In the example of FIG. 9, the first row indicates information of the first electricity storage system 10A, the second row indicates information of the second electricity storage system 10B, and the third row indicates information of the third electricity storage system 10C. The pieces of information exemplified in FIG. 9 are, for example, centrally managed by the control apparatus 30.

The electricity storage system ID is information for uniquely identifying each electricity storage system. State information is information indicating the state of each electricity storage apparatus of each electricity storage system, and illustrates rated capacity, charging and discharging performance, and SOC in the present example. However, the state information is not limited to the present example. Direction information is information indicating which of a charging direction or a discharging direction each electricity storage system is directed to. Measured power is calculated for each electricity storage system from the measurement results of the current transformers (132A, 132B, 132C, 134A, 134C) included in each electricity storage system. Each current transformer is capable of measuring power required by a load which is connected at the downstream side thereof. In the configuration of the first exemplary embodiment, the measured power in the current transformer 132A, the current transformer 132B, and the current transformer 132C indicates power required in the first load 120A, the second load 120B, and the third load 120C. In addition, the measured power in the current transformer 134A and the current transformer 134C indicates power generated by the distributed power supply 140A. That is, the measured power in the current transformer 132A and 134A indicates the state of excess or deficient power of the first electricity storage system 10A, the measured power in the current transformer 130B indicates the state of excess or deficient power of the second electricity storage system 10B, and the measured power in the current transformer 130C and the current transformer 132C indicates the state of excess or deficient power of the third electricity storage system 10C. The SOC or the measured power is acquired by each electricity storage apparatus, for example, at a predetermined interval, and is transmitted to the control apparatus 30. Note that, in a case where an electricity storage apparatus is performing a charging operation, the electricity storage apparatus can be regarded as a load. In this case, the control apparatus 30 acquires the value of charging power from the electricity storage apparatus, and adds the charging power to power required in a load.

In the example of FIG. 9, the determination unit 310 determines that power of 1 [kW] is in excess in the distribution line 50, on the basis of the measured power in each current transformer. The acquisition unit 320 acquires the direction information and the state information (rated capacity, charging and discharging performance, and SOC) of each electricity storage apparatus of each electricity storage system.

The selection unit 330 selects an electricity storage apparatus that executes a charging operation on the basis of the acquired pieces of information. In the example of FIG. 9, since the direction information of the second electricity storage apparatus 110B and the third electricity storage apparatus 110C is "charging", the selection unit 330 determines the second electricity storage apparatus 110B and the third electricity storage apparatus 110C as candidates for executing a charging operation. Further, the selection unit 330 determines the degrees of priority of the second electricity storage apparatus 110B and the third electricity storage apparatus 110C on the basis of the state information (rated capacity, charging and discharging performance, and SOC), and selects an electricity storage apparatus having a higher degree of priority as an electricity storage apparatus to perform a charging operation. The selection unit 330 determines the second electricity storage apparatus 110B having a large available capacity to be an electricity storage apparatus having a higher degree of priority, for example, on the basis of the rated capacity and the SOC.

Since the charging performance (2 [kW]) of the second electricity storage apparatus 110B exceeds the excess power (1 [kW]), the selection unit 330 determines that the excess power state can be resolved by the charging operation of the second electricity storage apparatus 110B. In this case, the control apparatus 30 transmits a command to the second electricity storage apparatus 110B for executing a charging operation of the excess 1 [kW]. The second electricity storage apparatus 110B starts a charging operation at 1 [kW], and the excess power state is resolved.

Note that, in a case where the charging performance of the second electricity storage apparatus 110B falls below the excess power, the selection unit 330 further transmits an execution instruction to the third electricity storage apparatus 110C for a charging operation for adjusting the remaining excess power. In a case where the excess power state is not resolved even by the charging operation of the third electricity storage apparatus 110C, the control apparatus 30 executes control for selling the remaining excess power to the system 40 or discarding the power.

<Process During Power Deficit>

A flow of the process B in the first exemplary embodiment will be described with reference to an example of FIG. 10. FIG. 10 is a diagram illustrating a specific operation example during power deficit in the first exemplary embodiment. In the example of FIG. 10, the first row indicates information of first electricity storage system 10A, the second row indicates information of the second electricity storage system 10B, and the third row indicates information of the third electricity storage system 10C. The pieces of information exemplified in FIG. 10 are the same as the pieces of information of FIG. 9, and are, for example, centrally managed by the control apparatus 30.

In the example of FIG. 10, the determination unit 310 determines that power of 3 [kW] is deficient in the distribution line 50, on the basis of the measured power in the current transformer 130A. The acquisition unit 320 acquires the direction information and the state information (rated capacity, charging and discharging performance, and SOC) of each electricity storage apparatus of each electricity storage system.

The selection unit 330 selects an electricity storage apparatus that executes a discharging operation on the basis of the acquired information. In the example of FIG. 10, since the direction information of the first electricity storage apparatus 110A and the second electricity storage apparatus 110B is "discharging", the selection unit 330 determines the first electricity storage apparatus 110A and the second electricity storage apparatus 110B as candidates for executing a discharging operation. The selection unit 330 determines the degrees of priority of the first electricity storage apparatus 110A and the second electricity storage apparatus 110B on the basis of the state information (rated capacity, charging and discharging performance, and SOC), and selects an electricity storage apparatus having a higher degree of priority as an electricity storage apparatus to perform a discharging operation. The selection unit 330 determines the second electricity storage apparatus 110B having a large residual capacity to be an electricity storage apparatus having a higher degree of priority, for example, on the basis of the rated capacity and the SOC.

Since the charging performance (2 [kW]) of the second electricity storage apparatus 110B falls below the deficient power (3 [kW]), the selection unit 330 determines that the power deficit state cannot be resolved by the discharging operation of the second electricity storage apparatus 110B. In this case, the selection unit 330 further selects the third electricity storage apparatus 110C as an electricity storage apparatus to perform a discharging operation. Since the total value (2+1.5=3.5 [kW]) of the charging performance of the second electricity storage apparatus 110B and the charging performance of the third electricity storage apparatus 110C exceeds the deficient power (3 [kW]), the selection unit 330 determines that the power deficit state can be resolved by the discharging operation of the second electricity storage apparatus 110B. The control apparatus 30 transmits, for example, a command for causing the second electricity storage apparatus 110B having a higher degree of priority to execute a discharging operation of 2 [kW] and a command for causing the third electricity storage apparatus 110C to execute a discharging operation of the remaining 1 [kW] to the second electricity storage apparatus 110B and the third electricity storage apparatus 110C, respectively. The second electricity storage apparatus 110B and the third electricity storage apparatus 110C start a discharging operation at 2 [kW] and 1 [kW], respectively, and the power deficit state is resolved.

Note that, in a case where the power deficit state is not resolved even by the charging operation of the third electricity storage apparatus 110C, the control apparatus 30 executes control for purchasing the remaining deficient power from the system 40 or not supplying the power in some cases.

Modification Example of Second Exemplary Embodiment

Figure 11:
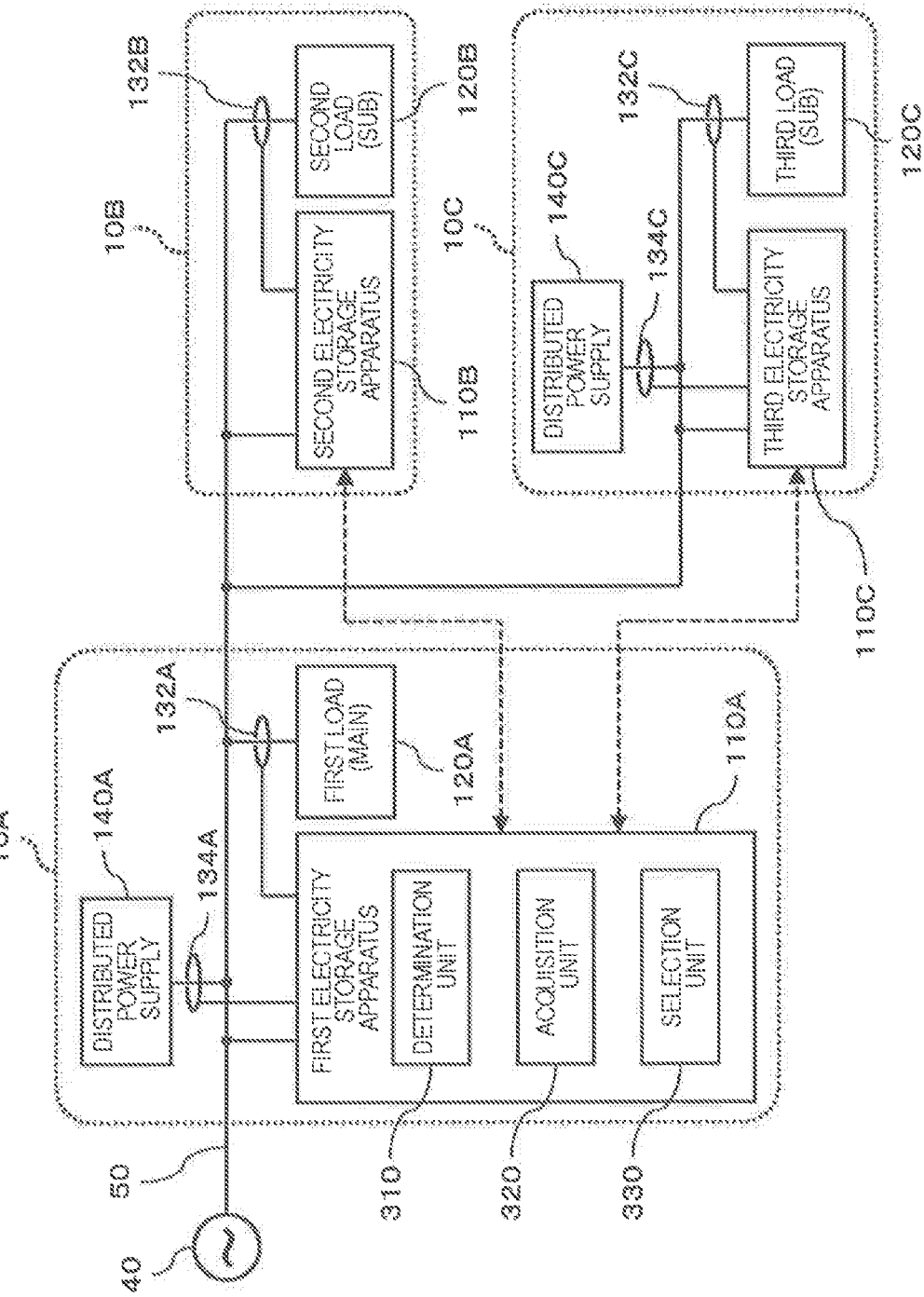
FIG. 11 is a diagram illustrating a configuration example of a distributed electricity storage system in a modification example of the second exemplary embodiment.

FIG. 11 is a diagram illustrating a configuration example of a distributed electricity storage system 1 in a modification example of the second exemplary embodiment. As shown in FIG. 11, one of a plurality of electricity storage apparatuses which are connected to the same distribution line 50 (first electricity storage apparatus 110A in the drawing) may include the determination unit 310, the acquisition unit 320, and the selection unit 330 described above. In this case, the electricity storage apparatus including the determination unit 310, the acquisition unit 320, and the selection unit 330 also functions as the above-described control apparatus 30. The present configuration also allows to obtain the above-described effect.

Third Exemplary Embodiment

As described above, it is preferable to repeat charging and discharging with a high depth from the viewpoint of battery life. Thus, it is preferable to perform control so that basically, the charging or discharging direction of each electricity storage apparatus is maintained without being changed until a predetermined condition for switching directions is satisfied. However, the excess power state may not be resolved by a charging operation performed by only the electricity storage apparatus(es) in the charging direction, or the power deficit state may not be resolved by a discharging operation of only the electricity storage apparatus(es) in the discharging direction. In the present exemplary embodiment, an aspect of coping with such a case more flexibly will be described. The distributed electricity storage system 1 of the present exemplary embodiment has the same configuration as that of the distributed electricity storage system 1 of the first exemplary embodiment or the second exemplary embodiment, except for the following points.

[Process Configuration]

In a case where the determination result of the determination unit 310 indicates excess power even when all the electricity storage apparatus(es) of which the direction information indicates a charging direction executes a charging operation, the selection unit 330 of the present exemplary embodiment selects an electricity storage apparatus of which the direction information is to be maintained in the discharging direction, using the state information of each electricity storage apparatus of which the direction information indicates a discharging direction.

Specifically, in each electricity storage apparatus of which the direction information indicates a discharging direction, the selection unit 330 determines the degree of priority for maintaining the direction information (degree of priority for maintaining the direction information) using the state information of each electricity storage apparatus. The selection unit 330 selects an electricity storage apparatus of which the direction information is to be maintained from each of the electricity storage apparatuses of which the direction information indicates a discharging direction, in accordance with the degree of priority for maintaining the direction information.

As described in the first exemplary embodiment, the state information is information which can be used as an index for determining the degree of priority of each electricity storage apparatus when selecting an electricity storage apparatus to perform a charging operation or a discharging operation. In other words, this degree of priority can also be referred as a degree of direction-maintaining priority for specifying the electricity storage apparatus to be maintained in the charging or discharging direction, in the case there is a need to switch the direction information of some electricity storage apparatuses. The selection unit 330 calculates the degree of direction-maintaining priority of an electricity storage apparatus in a discharging direction, using the state information of the electricity storage apparatus such as, for example, residual capacity, discharging performance, the number of cycles, or a distance to a load, as parameters of a predetermined expression. The selection unit 330 selects a predetermined number of electricity storage apparatuses, as electricity storage apparatuses of which the direction information is to be maintained in the discharging direction, for example, in decreasing order from the highest degree of direction-maintaining priority.

In addition, the selection unit 330 may select an electricity storage apparatus of which the direction information is to be maintained in the discharging direction, using at least one of pieces of information used as parameters in the above-described example. For example, the selection unit 330 can determine the degree of direction-maintaining priority, using the residual capacity of an electricity storage apparatus. An electricity storage apparatus having a large residual capacity would become fully charged shortly even if it is selected as an electricity storage apparatus to perform a charging operation. That is, in a case where an electricity storage apparatus having a large residual capacity is selected as an electricity storage apparatus to perform a charging operation, a charging operation with a low depth will be performed. Thus, such an electricity storage apparatus is preferably maintained to be in the discharging direction from the viewpoint of battery life, and may be considered as an electricity storage apparatus having a high degree of direction-maintaining priority. In addition, in a case where values of the highest-priority parameters are the same as each other, by setting the order of priority between respective parameters in advance, the selection unit 330 can determine the degree of direction-maintaining priority of each electricity storage apparatus. For example, in a case where two electricity storage apparatuses having the same residual capacity are to be determined in priority, the selection unit 330 can determine an electricity storage apparatus having higher charging performance as an electricity storage apparatus having a higher degree of direction-maintaining priority.

However, a method in which the selection unit 330 determines an electricity storage apparatus of which the direction information is to be maintained using the state information of each electricity storage apparatus is not limited to the above-described example.

In addition, the selection unit 330 selects at least one of electricity storage apparatuses other than the electricity storage apparatus selected as an electricity storage apparatus of which the direction information is to be maintained in a discharging direction, among the electricity storage apparatuses of which the direction information indicates a discharging direction, as an electricity storage apparatus to perform a charging operation. The selection unit 330 determines whether or not to select an electricity storage apparatus to perform a charging operation out of the electricity storage apparatuses of which the direction information indicates a discharging direction, for example, using information indicating whether charging of excess power is prioritized.

Specifically, in a case where information is set for prioritizing charging of excess power in the distributed electricity storage system 1, it is preferable that the selection unit 330 selects electricity storage apparatuses to perform a charging operation in order of an increasing degree of discharging priority. In addition, in a case where information is not set for prioritizing charging of excess power in the distributed electricity storage system 1, the selection unit 330 does not select an electricity storage apparatus to perform a charging operation. In this case, the control apparatus 30 executes control for selling or discarding the excess power.

In addition, here, the selection unit 330 changes the direction information of the electricity storage apparatus selected as an electricity storage apparatus to perform a charging operation to the charging direction, regardless of the condition for switching the direction information from the discharging direction to the charging direction as described in the first exemplary embodiment. In this manner, after the excess power state is resolved, the selected electricity storage apparatus returns to performing a discharging operation, and thus it is possible to prevent charging and discharging operations with a low depth.

In addition, in a case where the determination result of the determination unit 310 indicates a power deficit even when all the electricity storage apparatus(es) of which the direction information indicates a discharging direction executes a discharging operation, the selection unit 330 of the present exemplary embodiment selects an electricity storage apparatus of which the direction information is to be maintained in a charging direction, using the state information of each electricity storage apparatus of which the direction information indicates a charging direction.

Specifically, in each electricity storage apparatus of which the direction information indicates a charging direction, the selection unit 330 determines the degree of priority for maintaining the direction information (degree of direction-maintaining priority) using the state information of each electricity storage apparatus. The selection unit 330 selects an electricity storage apparatus of which the direction information is to be maintained from the respective electricity storage apparatuses of which the direction information indicates a charging direction, in accordance with the degree of direction-maintaining priority.

Similarly to the case where there is excess power, the selection unit 330 calculates the degree of direction-maintaining priority of an electricity storage apparatus in a charging direction, using the state information of the electricity storage apparatus such as, for example, available capacity, charging performance, the number of cycles, or a distance to a load, as each parameter of a predetermined expression. The selection unit 330 selects a predetermined number of electricity storage apparatuses, as electricity storage apparatuses of which the direction information is to be maintained in a charging direction, for example, in decreasing order from the highest degree of direction-maintaining priority.

In addition, the selection unit 330 may select an electricity storage apparatus of which the direction information is to be maintained in a charging direction, using at least one of pieces of information used as parameters in the above-described example. For example, the selection unit 330 can determine the degree of direction-maintaining priority, using the available capacity of an electricity storage apparatus. If an electricity storage apparatus having a large available capacity is selected as an electricity storage apparatus to perform a discharging operation, the discharge thereof would stop shortly. That is, in a case where an electricity storage apparatus having a large available capacity is selected as an electricity storage apparatus to perform a discharging operation, a discharging operation with a low depth will be performed. Thus, such an electricity storage apparatus is preferably maintained in the charging direction from the viewpoint of battery life, and may be considered as an electricity storage apparatus having a high degree of direction-maintaining priority. In addition, in a case where values of the highest-priority parameters are the same as each other, by setting the order of priority between respective parameters in advance, the selection unit 330 can determine the degree of direction-maintaining priority of each electricity storage apparatus. For example, in a case where two electricity storage apparatuses having the same available capacity are to be determined in priority, the selection unit 330 can determine an electricity storage apparatus having higher discharging performance as an electricity storage apparatus having a higher degree or direction-maintaining priority.

However, a method in which the selection unit 330 determines an electricity storage apparatus of which the direction information is to be maintained using the state information of each electricity storage apparatus is not limited to the above-described example.

In addition, the selection unit 330 selects at least one of electricity storage apparatuses other than the electricity storage apparatus selected as an electricity storage apparatus of which the direction information is to be maintained in the charging direction, among the electricity storage apparatuses of which the direction information indicates a charging direction, as an electricity storage apparatus to perform a discharging operation. The selection unit 330 selects an electricity storage apparatus to perform a discharging operation from the other electricity storage apparatuses, for example, until the deficient power is compensated for. At this time, the selection unit 330 may compare the degree of direction-maintaining priority of the charging operation of an electricity storage apparatus with a degree of significance of a power deficient load, to determine whether the electricity storage apparatus is selected as an electricity storage apparatus to perform a discharging operation. Here, the degree of significance of a load is information indicating the degree of influence when the load is stopped, in which, the higher the significance, the greater the damage when the load is stopped. The degree of significance of a load is set in advance, for example, in units of breakers, and is held in a storage unit or the like, not shown, of the control apparatus 30. In addition, the power deficient load can be determined using information (direction and magnitude of a current) or the like which is measured by a current transformer included in each electricity storage system.

Specifically, the selection unit 330 selects an electricity storage apparatus to be a candidate to perform a discharging operation from electricity storage apparatuses of which the direction information indicates a charging direction, and compares the selected apparatus with the degree of significance of the power deficient load. Preferably, the selection unit 330 selects loads for comparing in descending order of the degree of significance, and selects electricity storage apparatuses for comparing in ascending order of the degree of direction-maintaining priority. In a case where the degree of direction-maintaining priority of an electricity storage apparatus selected as a candidate is lower than the degree of significance of the power deficient load, the electricity storage apparatus is selected as an electricity storage apparatus to perform a discharging operation. On the other hand, in a case where the degree of direction-maintaining priority of an electricity storage apparatus selected as a candidate is higher than the degree of significance of the power deficient load, the electricity storage apparatus is not selected as an electricity storage apparatus to perform a discharging operation. In this case, the deficient power is supplied by purchasing from the system 40 side. In a case where power cannot be supplied from the system 40 due to a power failure or the like, the deficient power may remain unsupplied.

In addition, here, the selection unit 330 changes the direction information of the electricity storage apparatus selected as an electricity storage apparatus to perform a discharging operation to the discharging direction, regardless of the condition for switching the direction information from the charging direction to the discharging direction as described in the first exemplary embodiment. In this manner, after the power deficit state is resolved, the selected electricity storage apparatus returns to performing a charging operation, and thus it is possible to prevent charging and discharging operations with a low depth.

Operation Example

Figure 12:
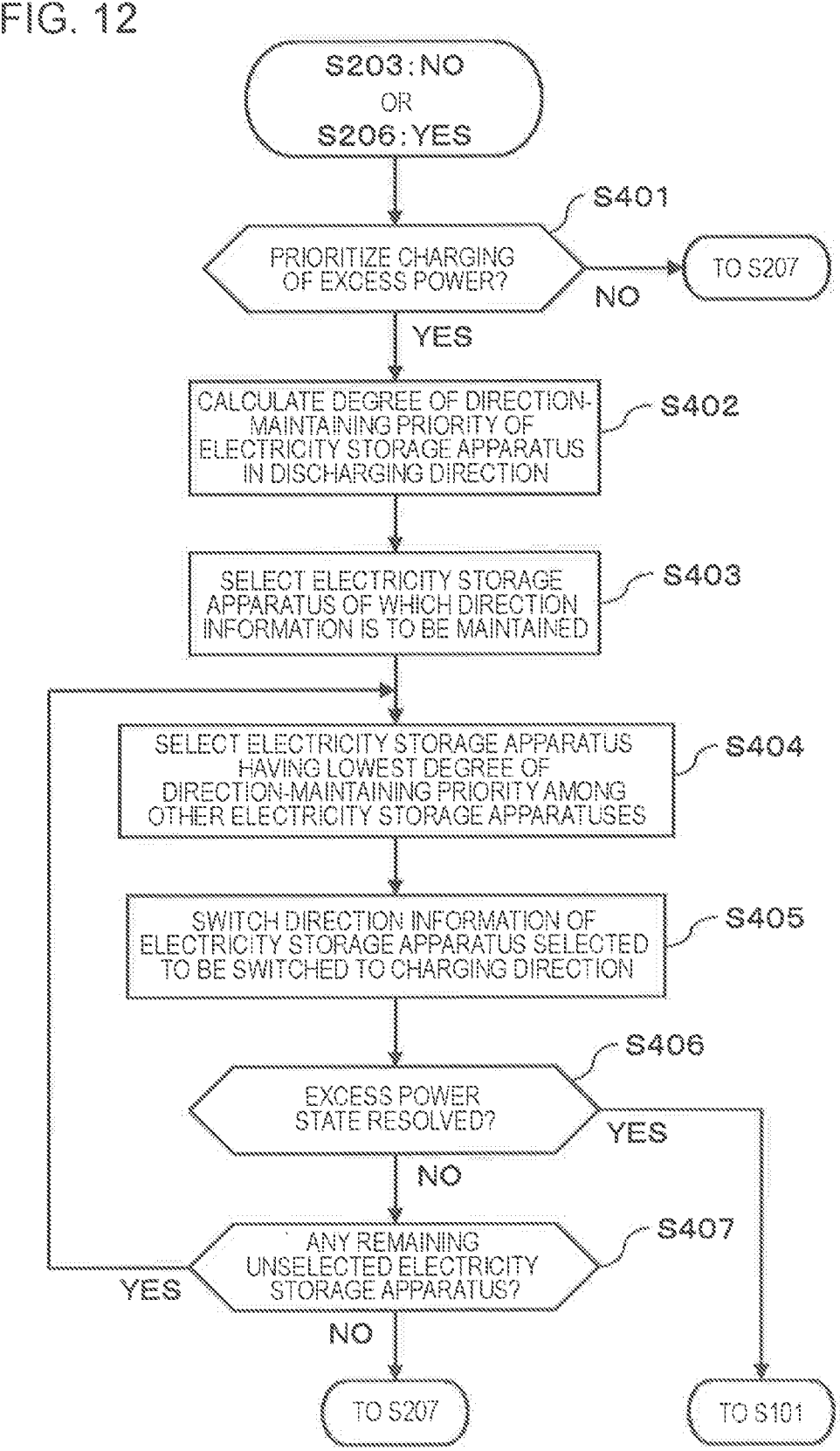
FIG. 12 is a flow diagram illustrating a processing flow during excess power in a distributed electricity storage system of a third exemplary embodiment.
Figure 13:
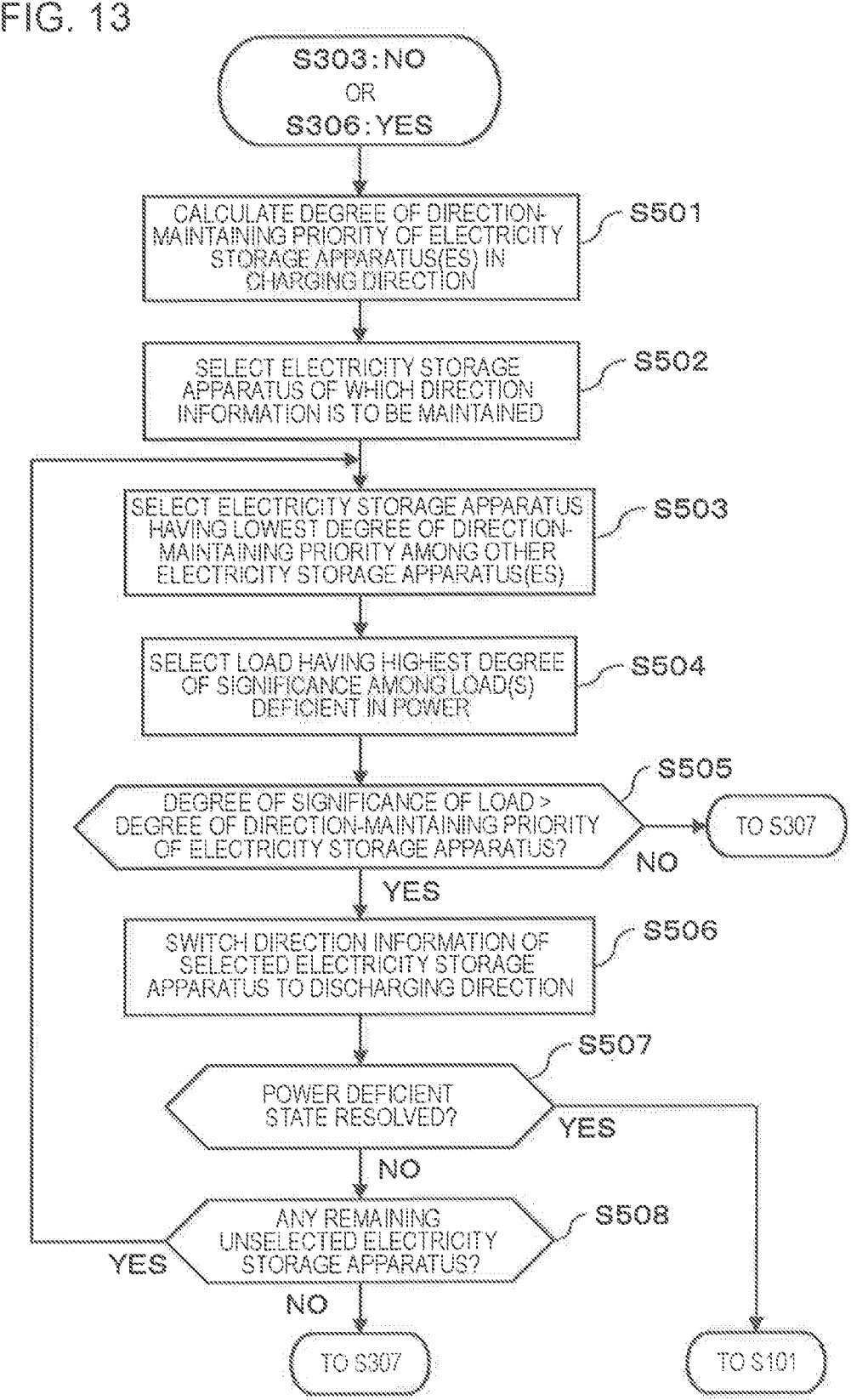
FIG. 13 is a flow diagram illustrating a processing flow during power deficit in the distributed electricity storage system of the third exemplary embodiment.

An operation example of a distributed electricity storage system 1 in the present exemplary embodiment will be described with reference to FIGS. 12 and 13.

<Process A: Process During Excess Power>

A process during excess power will be described with reference to FIG. 12. FIG. 12 is a flow diagram illustrating a processing flow during excess power in the distributed electricity storage system 1 of a third exemplary embodiment. Hereinafter, processes (S401 to S407) different from those in the first exemplary embodiment will be mainly described. These processes (S401 to S407) are executed when the determination result of S203 is "NO", or when the determination result of S206 is "YES".

The selection unit 330 checks whether information indicating that charging of excess power is prioritized is set in the distributed electricity storage system 1 (S401).

In a case where the information indicating that charging of excess power is prioritized is not set (S401: NO), the control apparatus 30 attempts to resolve the excess power state by selling the remaining excess power to the system 40 or by discarding the remaining excess power (S207).

On the other hand, in a case where the information indicating that charging of excess power is prioritized is set (S401: YES), the selection unit 330 calculates the degree of direction-maintaining priority of each electricity storage apparatus of which the direction information indicates a discharging direction (S402). The selection unit 330 can calculate the degree of direction-maintaining priority of the discharging operation of each electricity storage apparatus, using the state information (for example, residual capacity, discharging performance, the number of cycles, or distance from a load) of each electricity storage apparatus of which the direction information indicates a discharging direction. Specifically, the selection unit 330 can calculate the degree of direction-maintaining priority of the discharging operation of each electricity storage apparatus, for example, by assigning the state information of the electricity storage apparatus, as parameters, in the following Expression 1. However, a method of calculating the degree of direction-maintaining priority of the discharging operation is not limited to this method.

[Formula 1]

Degree of direction-maintaining priority of discharging operation=residual capacity×α+discharging performance×β+number of cycles×γ+distance from load×δ (Expression 1)

In Expression 1, α, β, γ and δ are weighting coefficients with respect to each parameter. The residual capacity and the discharging performance indicate the amount of dischargeable power and the magnitude of dischargeable power per unit time, respectively, and may refer to parameters for increasing the degree of direction-maintaining priority of the discharging operation. Thus, positive values, for example, are set for the weighting coefficients α and β. Different values may be set for the weighting coefficients α and β in accordance with the degrees of priority between the parameters. For example, in a case where the residual capacity is given more significance than the discharging performance, the value of the weighting coefficient α may be set larger than the value of the weighting coefficient β. On the other hand, the number of cycles is a factor reducing the amount of dischargeable power, and may be considered as a parameter lowering the degree of direction-maintaining priority of the discharging operation. Thus, a negative value, for example, is set for the weighting coefficient γ. In addition, the distance from a load is a parameter which is particularly irrelevant during excess power (no power deficient load is present), and thus 0, for example, can be set for the weighting coefficient δ (for disregarding the parameter of the distance from a load).

The selection unit 330 selects an electricity storage apparatus of which the direction information is to be maintained, using the degree of direction-maintaining priority of the discharging operation of each electricity storage apparatus (S403). For example, the selection unit 330 selects a predetermined number of electricity storage apparatuses, as electricity storage apparatuses of which the direction information is to be maintained, in decreasing order of the degree of direction-maintaining priority.

The selection unit 330 selects an electricity storage apparatus having the lowest degree of direction-maintaining priority among electricity storage apparatuses other than the electricity storage apparatus selected as an electricity storage apparatus of which the direction information is to be maintained, as an electricity storage apparatus to perform a charging operation (S404). At this time, the selection unit 330 switches the direction information of the selected electricity storage apparatus to the "charging direction" (S405).

The selection unit 330 determines whether the excess power state is resolved by the charging operation of the electricity storage apparatus(es) selected in S204 and S404 (S406). In a case where the excess power state is to be resolved (S406: YES), the control apparatus 30 transmits an instruction for starting a charging operation to each selected electricity storage apparatus, and terminates the process. In this case, the process returns to S101, and the control apparatus 30 continues to monitor the state of excess power or power deficit in the distribution line 50. On the other hand, in a case where the excess power state is not to be resolved (S406: NO), the selection unit 330 determines whether an unselected electricity storage apparatus remains among electricity storage apparatuses other than the electricity storage apparatus selected as an electricity storage apparatus of which the direction information is to be maintained (S407).

In a case where an unselected electricity storage apparatus is present among electricity storage apparatuses other than the electricity storage apparatus selected as an electricity storage apparatus of which the direction information is to be maintained (S407: YES), that is, in a case where an electricity storage apparatus in a discharging direction capable of being used for adjusting the excess power is still present, the selection unit 330 repeats the process from S404 described above. On the other hand, in a case where all the electricity storage apparatuses other than the electricity storage apparatus selected as an electricity storage apparatus of which the direction information is to be maintained are selected (S407: NO), that is, in a case where the excess power state cannot be resolved even when all of the other electricity storage apparatuses are used as the electricity storage apparatus in the charging direction, the control apparatus 30 steps out of the repeating process and transmits an instruction for starting a charging operation to the selected electricity storage apparatus. In addition, the control apparatus 30 attempts to resolve the excess power state by selling the remaining excess power to the system 40 or discarding the remaining excess power (S207).

<Process B: Process During Power Deficit>

A process during a power deficit will be described with reference to FIG. 13. FIG. 13 is a flow diagram illustrating a processing flow during a power deficit in the distributed electricity storage system 1 of the third exemplary embodiment. Hereinafter, processes (S501 to S508) different from those in the first exemplary embodiment will be mainly described. These processes (S501 to S508) are executed in a case where the determination result of S303 is "NO", or in a case where the determination result of S306 is "YES".

The selection unit 330 calculates the degree of direction-maintaining priority of each electricity storage apparatus of which the direction information indicates a charging direction (S501). The selection unit 330 can calculate the degree of direction-maintaining priority of the charging operation of each electricity storage apparatus, using the state information (for example, available capacity, charging performance, the number of cycles, or distance from a load) of each electricity storage apparatus of which the direction information indicates a discharging direction. Specifically, the selection unit 330 can calculate the degree of direction-maintaining priority of the charging operation of each electricity storage apparatus, for example, by assigning the state information of the electricity storage apparatus, as parameters, in the following Expression 2. However, a method of calculating the degree of direction-maintaining priority of the charging operation is not limited to this method.

[Formula 2]

Degree of direction-maintaining priority of charging operation=available capacity×α+charging performance×β+number of cycles×γ+distance from load×δ (Expression 2)

In Expression 2 above, α, β, γ and δ are weighting coefficients with respect to each parameter. The available capacity and the charging performance indicate the amount of chargeable power and the magnitude of chargeable power per unit time, respectively, and may be considered as parameters for increasing the degree of direction-maintaining priority of the charging operation. Thus, positive values, for example, are set for the weighting coefficients α and β. Different values may be set for the weighting coefficients α and β in accordance with the degree of priority between the parameters. For example, in a case where the available capacity is given more significance than the charging performance, the value of the weighting coefficient α may be set larger than the value of the weighting coefficient β. On the other hand, the number of cycles is a factor reducing the amount of chargeable power, and may be considered as a parameter lowering the degree of direction-maintaining priority of the charging operation. Thus, a negative value, for example, is set for the weighting coefficient γ. In addition, in a case where a distance between an electricity storage apparatus and a load is large, a power loss when power is fed from the electricity storage apparatus becomes larger. That is, the discharging efficiency of an electricity storage apparatus decreases as the distance from a load becomes larger. Therefore, the weighting coefficient δ is set so that the degree of direction-maintaining priority of the charging operation of an electricity storage apparatus increases as the distance from a load becomes larger. A positive value, for example, may be set for the weighting coefficient δ.

The selection unit 330 selects an electricity storage apparatus of which the direction information is to be maintained, using the degree of direction-maintaining priority of the charging operation of each electricity storage apparatus (S502). For example, the selection unit 330 selects a predetermined number of electricity storage apparatuses, as electricity storage apparatuses of which the direction information is maintained, in decreasing order of the degree of direction-maintaining priority.

The selection unit 330 selects an electricity storage apparatus having the lowest degree of direction-maintaining priority among electricity storage apparatuses other than the electricity storage apparatus selected as an electricity storage apparatus of which the direction information is to be maintained, as a candidate of an electricity storage apparatus to perform a discharging operation (S503). In addition, the selection unit 330 identifies power deficient loads using the information or the like measured by a current transformer included in each electricity storage system, and selects a load having the highest degree of significance among the loads (S504).

The selection unit 330 determines whether the degree of significance of the selected load is higher than the degree of direction-maintaining priority of the selected electricity storage apparatus (S505). In a case where the degree of significance of the selected load is equal to or less than the degree of direction-maintaining priority of the selected electricity storage apparatus (S505: NO), the selection unit 330 does not select an electricity storage apparatus to perform a discharging operation. In this case, the control apparatus 30 may execute control for purchasing the remaining deficient power from the system, or may not supply the remaining deficient power in some cases (S307). On the other hand, in a case where the degree of significance of the selected load is higher than the degree of direction-maintaining priority of the selected electricity storage apparatus (S505: NO), the selection unit 330 selects the electricity storage apparatus as an electricity storage apparatus to perform a discharging operation. In addition, the selection unit 330 switches the direction information of the selected electricity storage apparatus to the "charging direction" (S506).

The selection unit 330 determines whether the power deficit state is resolved by the discharging operation of the electricity storage apparatus selected in S304 and S503 (S507). In a case where the power deficit state is resolved (S507: YES), the control apparatus 30 transmits an instruction for starting a discharging operation to the selected electricity storage apparatus, and terminates the process. In this case, the process returns to S101, and the control apparatus 30 continues to monitor the state of excess or deficient power in the distribution line 50. On the other hand, in a case where the power deficit state is not resolved (S507: NO), the selection unit 330 determines whether an unselected electricity storage apparatus remains among electricity storage apparatuses other than the electricity storage apparatus selected as an electricity storage apparatus of which the direction information is to be maintained (S508).

In a case where an unselected electricity storage apparatus is present among electricity storage apparatuses other than the electricity storage apparatus selected as an apparatus of which the direction information is maintained (S507: YES), that is, in a case where an electricity storage apparatus capable of being used for adjusting the deficient power is still present, the selection unit 330 repeats the process from S503 described above. On the other hand, in a case where all the electricity storage apparatuses other than the electricity storage apparatus selected as an apparatus of which the direction information is to be maintained are selected (S306: YES), that is, in a case where the power deficit state cannot be resolved even when all of the other electricity storage apparatuses are discharged, the control apparatus 30 steps out of the repeating process and transmits an instruction for starting a discharging operation to the selected electricity storage apparatus. In addition, in this case, the control apparatus 30 may execute control for purchasing the remaining deficient power from the system, or may not supply the remaining deficient power in some cases (S307).

Operation and Effect of Third Exemplary Embodiment

As stated above, in the present exemplary embodiment, in a case where the excess power state cannot be resolved even when electricity storage apparatuses in the charging direction are all charged, an electricity storage apparatus of which the direction information is to be maintained and an electricity storage apparatus to perform a charging operation are selected among the electricity storage apparatuses of which the direction information indicates a discharging direction. In addition, in a case where the power deficit state cannot be resolved even when electricity storage apparatuses in the charging direction are all discharged, an electricity storage apparatus of which the direction information is maintained and an electricity storage apparatus to perform a discharging operation are selected among the electricity storage apparatuses of which the direction information indicates a charging direction. Thereby, it is possible to secure an electricity storage apparatus that prevents the battery life from deteriorating and to resolve or alleviate an excess power state and a power deficit state.

As described above, although the exemplary embodiments of the present invention have been set forth with reference to the accompanying drawings, the exemplary embodiments are merely illustrative of the present invention, and various configurations other than those stated above can be adopted.

In addition, in a plurality of flow diagrams using the aforementioned description, a plurality of processes are described in order, but the execution order of processes which are executed in each exemplary embodiment is not limited to the described order. In each exemplary embodiment, the order of processes shown can be changed within a range without causing any problem in terms of contents. In addition, each exemplary embodiment described above can be combined in a range consistent with the contents thereof.

Hereinafter, examples of reference forms are appended.

1. A distributed electricity storage system including:
a plurality of electricity storage apparatuses connected to a same distribution line;
a determination unit that determines excess or deficient power in the distribution line;
an acquisition unit that acquires, with respect to each of the plurality of electricity storage apparatuses, state information indicating a state of an electricity storage apparatus and direction information indicating an operating direction of a charging direction or a discharging direction; and
a selection unit that selects an electricity storage apparatus to be controlled in the charging and discharging operations from the plurality of electricity storage apparatuses, using a determination result of the excess or deficient power, the state information, and the direction information.

2. The distributed electricity storage system according to 1, wherein, in a case where the determination result indicates deficient power, the selection unit selects an electricity storage apparatus to perform a discharging operation out of electricity storage apparatus(es) of which the direction information indicates a discharging direction, using the state information of each electricity storage apparatus of which the direction information indicates a discharging direction.

3. The distributed electricity storage system according to 1 or 2, wherein, in a case where the determination result indicates excess power, the selection unit selects an electricity storage apparatus to perform a charging operation out of electricity storage apparatus(es) of which the direction information indicates a charging direction, using the state information of each electricity storage apparatus of which the direction information indicates a charging direction.

4. The distributed electricity storage system according to any one of 1 to 3, wherein the acquisition unit acquires at least any one of a capacity of an electricity storage apparatus, charging and discharging performance of an electricity storage apparatus, a degree of deterioration of an electricity storage apparatus, and a distance from an electricity storage apparatus to a load, as the state information.

5. The distributed electricity storage system according to any one of 1 to 4, wherein, in a case where the determination result indicates a power deficit even when all the electricity storage apparatus(es) of which the direction information indicates a discharging direction execute a discharging operation, the selection unit selects an electricity storage apparatus of which the direction information is to be maintained in the charging direction, using the state information of each electricity storage apparatus of which the direction information indicates a charging direction.

6. The distributed electricity storage system according to 5, wherein the selection unit selects at least one electricity storage apparatus, other than the electricity storage apparatus selected as an electricity storage apparatus of which the direction information is to be maintained in the charging direction, out of the electricity storage apparatus(es) of which the direction information indicates a charging direction, as an electricity storage apparatus to perform a discharging operation.

7. The distributed electricity storage system according to any one of 1 to 6, wherein, in a case where the determination result indicates excess power even when all the electricity storage apparatus(es) of which the direction information indicates a charging direction execute a charging operation, the selection unit selects an electricity storage apparatus of which the direction information is to be maintained in the discharging direction, using the state information of each electricity storage apparatus of which the direction information indicates a discharging direction.

8. The distributed electricity storage system according to 7, wherein the selection unit selects at least one electricity storage apparatus, other than the electricity storage apparatus selected as an electricity storage apparatus of which the direction information is to be maintained in the discharging direction, out of the electricity storage apparatus(es) of which the direction information indicates a discharging direction, as an electricity storage apparatus to perform a charging operation.

9. A power control method executed in a distributed electricity storage system including a plurality of electricity storage apparatuses connected to a same distribution line, the method performed by a computer included in the distributed electricity storage system including:
determining excess or deficient power in the distribution line;
acquiring, with respect to each of the plurality of electricity storage apparatuses, state information indicating a state of an electricity storage apparatus and direction information indicating an operating direction of a charging direction or a discharging direction; and
selecting an electricity storage apparatus to be controlled in the charging and discharging operations from the plurality of electricity storage apparatuses, using a determination result of the excess or deficient power, the state information, and the direction information.

10. The power control method according to 9, performed by the computer, further including selecting an electricity storage apparatus to perform a discharging operation out of electricity storage apparatus(es) of which the direction information indicates a discharging direction, using the state information of each electricity storage apparatus of which the direction information indicates a discharging direction, in a case where the determination result indicates deficient power.

11. The power control method according to 9 or 10, performed by the computer, further including selecting an electricity storage apparatus to perform a charging operation out of electricity storage apparatuses of which the direction information indicates a charging direction, using the state information of each electricity storage apparatus of which the direction information indicates a charging direction, in a case where the determination result indicates excess power.

12. The power control method according to any one of 9 to 11, performed by the computer, further including acquiring at least any one of a capacity of an electricity storage apparatus, charging and discharging performance of an electricity storage apparatus, a degree of deterioration of an electricity storage apparatus, and a distance from an electricity storage apparatus to a load, as the state information.

13. The power control method according to any one of 9 to 12, performed by the computer, further including selecting an electricity storage apparatus of which the direction information is to be maintained in the charging direction, using the state information of each electricity storage apparatus of which the direction information indicates a charging direction, in a case where the determination result indicates deficient power even when all the electricity storage apparatus(es) of which the direction information indicates a discharging direction execute a discharging operation.

14. The power control method according to 13, performed by the computer, further including selecting at least one electricity storage apparatus, other than the electricity storage apparatus selected as an electricity storage apparatus of which the direction information is to be maintained in the charging direction, out of the electricity storage apparatus(es) of which the direction information indicates a charging direction, as an electricity storage apparatus to perform a discharging operation.

15. The power control method according to any one of 9 to 14, performed by the computer, further including selecting an electricity storage apparatus of which the direction information is to be maintained in the discharging direction, using the state information of each electricity storage apparatus of which the direction information indicates a discharging direction, in a case where the determination result indicates excess power even when all the electricity storage apparatus(es) of which the direction information indicates a charging direction execute a charging operation.

16. The power control method according to 15, performed by the computer, further including selecting at least one electricity storage apparatus, other than the electricity storage apparatus selected as an electricity storage apparatus of which the direction information is to be maintained in the discharging direction, out of the electricity storage apparatus(es) of which the direction information indicates a discharging direction, as an electricity storage apparatus to perform a charging operation.

17. A program executed in a distributed electricity storage system including a plurality of electricity storage apparatuses connected to a same distribution line, the program causing a computer included in the distributed electricity storage system to function as:

a determination unit that determines excess or deficient power in the distribution line;

an acquisition unit that acquires, with respect to each of the plural electricity storage apparatuses, state information indicating a state of an electricity storage apparatus and direction information indicating an operating direction of a charging direction or a discharging direction; and a selection unit that selects an electricity storage apparatus to be controlled in charging and discharging operations out of the plurality of electricity storage apparatuses, using a determination result of the excess or deficient power, the state information, and the direction information.

18. The program according to 17, further including causing the computer to function as the selection unit that selects an electricity storage apparatus to perform a discharging operation from electricity storage apparatus(es) of which the direction information indicates a discharging direction, using the state information of each electricity storage apparatus of which the direction information indicates a discharging direction, in a case where the determination result indicates deficient power.

19. The program according to 17 or 18, further including causing the computer to function as the selection unit that selects an electricity storage apparatus to perform a charging operation out of electricity storage apparatus(es) of which the direction information indicates a charging direction, using the state information of each electricity storage apparatus of which the direction information indicates a charging direction, in a case where the determination result indicates excess power.

20. The program according to any one of 17 to 19, further including causing the computer to function as the acquisition unit that acquires at least any one of a capacity of an electricity storage apparatus, charging and discharging performance of an electricity storage apparatus, a degree of deterioration of an electricity storage apparatus, and a distance from an electricity storage apparatus to a load, as the state information.

21. The program according to any one of 17 to 20, further including causing the computer to function as the selection unit that selects an electricity storage apparatus of which the direction information is to be maintained in the charging direction, using the state information of each electricity storage apparatus of which the direction information indicates a charging direction, in a case where the determination result indicates deficient power even when all the electricity storage apparatus(es) of which the direction information indicates a discharging direction execute a discharging operation.

22. The program according to 21, further including causing the computer to function as the selection unit that selects at least one electricity storage apparatus, other than the electricity storage apparatus selected as an electricity storage apparatus of which the direction information is to be maintained in the charging direction, out of the electricity storage apparatus(es) of which the direction information indicates a charging direction, as an electricity storage apparatus to perform a discharging operation.

23. The program according to any one of 17 to 22, further including causing the computer to function as the selection unit that selects an electricity storage apparatus of which the direction information is to be maintained in the discharging direction, using the state information of each electricity storage apparatus of which the direction information indicates a discharging direction, in a case where the determination result indicates excess power even when all the electricity storage apparatus(es) of which the direction information indicates a charging direction execute a charging operation.

24. The program according to 23, further including causing the computer to function as the selection unit that selects at least one electricity storage apparatus, other than the electricity storage apparatus selected as an electricity storage apparatus of which the direction information is to be maintained in the discharging direction, out of the electricity storage apparatus(es) of which the direction information indicates a discharging direction, as an electricity storage apparatus to perform a charging operation.

This application claims priority from Japanese Patent application No. 2015-067118 filed on Mar. 27, 2015, the content of which is incorporated, herein by reference in its entirety.

The invention claimed is:

1. A distributed electricity storage system comprising:
a plurality of electricity storage apparatuses connected to a same distribution line;
a determination unit that determines excess or deficient power in the distribution line;
an acquisition unit that acquires, with respect to each of the plurality of electricity storage apparatuses, state information indicating a state of an electricity storage apparatus and direction information indicating whether a present operating direction of the electricity storage apparatus is a charging direction or a discharging direction; and
a selection unit that selects an electricity storage apparatus to be controlled in charging and discharging operations from the plurality of electricity storage apparatuses, using a determination result of the excess or deficient power, the state information, and the direction information;
wherein, based on the determination result indicating a power deficit, the selection unit selects an electricity storage apparatus to perform a discharging operation out of electricity storage apparatus(es) of which the direction information indicates a discharging direction, using the state information of each electricity storage apparatus of which the direction information indicates a discharging direction,
wherein, based on the determination result indicating excess power, the selection unit selects an electricity storage apparatus to perform a charging operation out of electricity storage apparatus(es) of which the direction information indicates a charging direction, using the state information of each electricity storage apparatus of which the direction information indicates a charging direction, and
wherein, based on the determination result indicating equilibrium state of power, the determination unit repeats the determination of excess or deficient power in the distribution line.

2. The distributed electricity storage system according to claim 1, wherein the acquisition unit acquires at least any one of a capacity of an electricity storage apparatus, charging and discharging performance of an electricity storage apparatus, a degree of deterioration of an electricity storage apparatus, and a distance from an electricity storage apparatus to a load, as the state information.

3. The distributed electricity storage system according to claim 1, wherein, based on the determination result indicating a power deficit even when all the electricity storage apparatus(es) of which the direction information indicates a discharging direction execute a discharging operation, the selection unit selects an electricity storage apparatus of which the direction information is to be maintained in the charging direction, using the state information of each electricity storage apparatus of which the direction information indicates a charging direction.

4. The distributed electricity storage system according to claim 3, wherein the selection unit selects at least one electricity storage apparatus, other than the electricity storage apparatus selected as an electricity storage apparatus of which the direction information is to be maintained in the charging direction, out of the electricity storage apparatus(es) of which the direction information indicates a charging direction, as an electricity storage apparatus to perform a discharging operation.

5. The distributed electricity storage system according to claim 1, wherein, based on the determination result indicating excess power even when all the electricity storage apparatus(es) of which the direction information indicates a charging direction execute a charging operation, the selection unit selects an electricity storage apparatus of which the direction information is to be maintained in the discharging direction, using the state information of each electricity storage apparatus of which the direction information indicates a discharging direction.

6. The distributed electricity storage system according to claim 5, wherein the selection unit selects at least one electricity storage apparatus, other than the electricity storage apparatus selected as an electricity storage apparatus of which the direction information is to be maintained in the discharging direction, out of the electricity storage apparatus(es) of which the direction information indicates a discharging direction, as an electricity storage apparatus to perform a charging operation.

7. A power control method executed in a distributed electricity storage system comprising a plurality of electricity storage apparatuses connected to a same distribution line, the method performed by a computer included in the distributed electricity storage system comprising:
determining excess or deficient power in the distribution line;
acquiring, with respect to each of the plurality of electricity storage apparatuses, state information indicating a state of an electricity storage apparatus and direction information indicating whether a present operating direction of the electricity storage apparatus is a charging direction or a discharging direction; and
selecting an electricity storage apparatus to be controlled in charging and discharging operations from the plurality of electricity storage apparatuses, using a determination result of the excess or deficient power, the state information, and the direction information,
wherein, based on the determination result indicating a power deficit, selecting an electricity storage apparatus to perform a discharging operation out of electricity storage apparatus(es) of which the direction information indicates a discharging direction, using the state information of each electricity storage apparatus of which the direction information indicates a discharging direction,
wherein, based on the determination result indicating excess power, selecting an electricity storage apparatus to perform a charging operation out of electricity storage apparatus(es) of which the direction information indicates a charging direction, using the state information of each electricity storage apparatus of which the direction information indicates a charging direction, and
wherein, based on the determination result indicating equilibrium state of power, repeating the determination of excess or deficient power in the distribution line.

8. A non-transitory computer readable medium storing a program executed in a distributed electricity storage system comprising a plurality of electricity storage apparatuses connected to a same distribution line, the program causing a computer included in the distributed electricity storage system to function as execute a method comprising:

determining excess or deficient power in the distribution line;

acquiring, with respect to each of the plurality of electricity storage apparatuses, state information indicating a state of an electricity storage apparatus and direction information indicating whether a present operating direction of the electricity storage apparatus is a charging direction or a discharging direction; and selecting an electricity storage apparatus to be controlled in charging and discharging operations from the plurality of electricity storage apparatuses, using a determination result of the excess or deficient power, the state information, and the direction information, wherein, based on the determination result indicating a power deficit, selecting an electricity storage apparatus to perform a discharging operation out of electricity storage apparatus(es) of which the direction information indicates a discharging direction, using the state information of each electricity storage apparatus of which the direction information indicates a discharging direction, wherein, based on the determination result indicating excess power, selecting an electricity storage apparatus to perform a charging operation out of electricity storage apparatus(es) of which the direction information indicates a charging direction, using the state information of each electricity storage apparatus of which the direction information indicates a charging direction, and wherein, based on the determination result indicating equilibrium state of power, repeating the determination of excess or deficient power in the distribution line.

* * * * *